US010355281B2

(12) United States Patent
Akahane et al.

(10) Patent No.: US 10,355,281 B2
(45) Date of Patent: Jul. 16, 2019

(54) CONDUCTIVE PASTE FOR LITHIUM-ION BATTERY POSITIVE ELECTRODES AND MIXTURE PASTE FOR LITHIUM-ION BATTERY POSITIVE ELECTRODES

(71) Applicants: KANSAI PAINT CO., LTD., Hyogo (JP); TOYOTA JIDOSHA KABUSHIKI KAISHA, Aichi-ken (JP)

(72) Inventors: Junji Akahane, Kanagawa (JP); Koji Endo, Kanagawa (JP); Takanori Ito, Kanagawa (JP); Atsuya Kato, Kanagawa (JP); Hideki Hagiwara, Aichi-ken (JP); Machiko Abe, Aichi-ken (JP); Kosuke Iwase, Aichi-ken (JP); You Kato, Aichi-ken (JP); Kazuyuki Kuwano, Aichi-ken (JP); Sachio Takeda, Aichi-ken (JP)

(73) Assignees: KANSAI PAINT CO., LTD., Hyogo (JP); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/405,410

(22) Filed: Jan. 13, 2017

(65) Prior Publication Data

US 2017/0207461 A1  Jul. 20, 2017

(30) Foreign Application Priority Data

Jan. 15, 2016  (JP) ................. 2016-006300

(51) Int. Cl.
| | |
|---|---|
| *H01B 1/24* | (2006.01) |
| *H01M 4/62* | (2006.01) |
| *H01M 4/131* | (2010.01) |
| *H01M 10/0525* | (2010.01) |
| *C08F 220/18* | (2006.01) |
| *C08F 220/30* | (2006.01) |
| *C09D 5/24* | (2006.01) |
| *C09D 133/14* | (2006.01) |
| *H01M 2/16* | (2006.01) |

(Continued)

(52) U.S. Cl.
CPC .......... *H01M 4/625* (2013.01); *C08F 220/18* (2013.01); *C08F 220/30* (2013.01); *C09D 5/24* (2013.01); *C09D 133/14* (2013.01); *H01B 1/24* (2013.01); *H01M 2/1653* (2013.01); *H01M 2/1686* (2013.01); *H01M 4/131* (2013.01); *H01M 4/133* (2013.01); *H01M 4/505* (2013.01); *H01M 4/525* (2013.01); *H01M 4/587* (2013.01); *H01M 4/622* (2013.01); *H01M 4/661* (2013.01); *H01M 10/0525* (2013.01); *H01M 10/0568* (2013.01); *H01M 10/0569* (2013.01); *C08F 2220/1825* (2013.01); *C08F 2220/301* (2013.01); *C08F 2220/303* (2013.01); *C08K 3/04* (2013.01); *C08K 2201/001* (2013.01); *H01M 4/0404* (2013.01); *H01M 4/0435* (2013.01); *H01M 4/0471* (2013.01); *H01M 4/1391* (2013.01); *H01M 4/1393* (2013.01); *H01M 2004/021* (2013.01); *H01M 2004/028* (2013.01); *H01M 2300/004* (2013.01)

(58) Field of Classification Search
CPC ......... H01M 10/0525; H01M 10/0568; H01M 10/0569; H01M 2004/021; H01M 2004/028; H01M 2300/004; H01M 2/1653; H01M 2/1686; H01M 4/0404; H01M 4/0435; H01M 4/0471; H01M 4/131; H01M 4/133; H01M 4/1391; H01M 4/1393; H01M 4/505; H01M 4/525; H01M 4/587; H01M 4/622; H01M 4/625; H01M 4/661; H01B 1/24
See application file for complete search history.

(56) References Cited

U.S. PATENT DOCUMENTS

| | | | |
|---|---|---|---|
| 2013/0323590 A1* | 12/2013 | Kageura | H01M 4/131 429/211 |
| 2014/0242295 A1* | 8/2014 | Motoda | H01M 2/166 427/541 |

(Continued)

FOREIGN PATENT DOCUMENTS

| | | |
|---|---|---|
| JP | 11-250915 | 9/1999 |
| JP | 2007-231264 | 9/2007 |

(Continued)

OTHER PUBLICATIONS

Office Action dated Feb. 6, 2018 in Japanese Application No. 2016-252692, with English Translation.

(Continued)

*Primary Examiner* — Mark Kopec
*Assistant Examiner* — Jaison P Thomas
(74) *Attorney, Agent, or Firm* — Wenderoth, Lind & Ponack, L.L.P.

(57) ABSTRACT

This invention relates to a conductive paste for lithium-ion battery positive electrodes and a mixture paste for a lithium ion battery positive electrode that have an easy-to-apply viscosity, even when a relatively small amount of a dispersion resin is incorporated. More specifically, the invention provides a conductive paste for lithium-ion battery positive electrodes, the conductive paste comprising a dispersion resin (A), conductive carbon (B), and a solvent (C), the dispersion resin (A) containing a resin (A1), the resin (A1) containing, as one constituent component, a polymerizable unsaturated group-containing monomer (A1-1) represented by a specific formula.

9 Claims, No Drawings

(51) Int. Cl.
*H01M 4/133* (2010.01)
*H01M 4/505* (2010.01)
*H01M 4/525* (2010.01)
*H01M 4/587* (2010.01)
*H01M 4/66* (2006.01)
*H01M 10/0568* (2010.01)
*H01M 10/0569* (2010.01)
*H01M 4/1391* (2010.01)
*C08K 3/04* (2006.01)
*H01M 4/04* (2006.01)
*H01M 4/1393* (2010.01)
*H01M 4/02* (2006.01)

(56) References Cited

U.S. PATENT DOCUMENTS

2014/0349185 A1 11/2014 Momose et al.
2015/0038633 A1* 2/2015 Shibutani ................. C08F 8/14
524/503
2015/0372307 A1* 12/2015 Shigematsu ............ H01M 4/13
429/217
2016/0172678 A1 6/2016 Oyama et al.

FOREIGN PATENT DOCUMENTS

| JP | 2012-204246 | 10/2012 | |
| JP | 2013-65509 | 4/2013 | |
| JP | 2013-89485 | 5/2013 | |
| JP | 2013-211161 | 10/2013 | |
| JP | 2013235789 A * | 11/2013 | .............. H01M 4/13 |
| JP | 2014-193986 | 10/2014 | |
| KR | 10-2014-0116190 | 10/2014 | |
| WO | 2013/099520 | 7/2013 | |

OTHER PUBLICATIONS

Extended European Search Report dated Apr. 26, 2017 in corresponding European Application No. 17000062.4.
Office Action dated Feb. 26, 2018 in Korean Application No. 10-2017-0005074, with English translation.

* cited by examiner

CONDUCTIVE PASTE FOR LITHIUM-ION BATTERY POSITIVE ELECTRODES AND MIXTURE PASTE FOR LITHIUM-ION BATTERY POSITIVE ELECTRODES

TECHNICAL FIELD

The present invention relates to a conductive paste for lithium-ion battery positive electrodes and a mixture paste for lithium-ion battery positive electrodes.

BACKGROUND ART

A lithium-ion secondary battery is one type of non-aqueous electrolyte secondary battery, and is a secondary battery in which lithium ions in the electrolyte are responsible for electrical conduction. A lithium-ion secondary battery has excellent characteristics, such as high energy density, excellent charged energy-retention characteristics, and a small memory effect, i.e., apparent capacity reduction. Thus, lithium-ion secondary batteries are used in a wide range of fields, such as cellular phones, smartphones, personal computers, hybrid automobiles, and electric vehicles.

A lithium-ion secondary battery mainly comprises a positive-electrode plate, a negative-electrode plate, a separator that insulates the positive- and negative-electrode plates, and a non-aqueous electrolyte solution. The positive-electrode plate is obtained by forming a positive-electrode mixture layer on a surface of a positive-electrode core. This positive-electrode mixture layer may be produced by applying a positive-electrode mixture paste to a surface of a positive-electrode core, followed by drying. The positive-electrode mixture paste is obtained by mixing an electrode active material with a conductive paste containing a conductive auxiliary agent (e.g., carbon), a binder, and a solvent.

As described above, the production of a positive-electrode mixture layer is performed by applying a positive-electrode mixture paste to a surface of a positive-electrode core. Thus, the positive-electrode mixture paste, as well as the conductive paste, which is a component of the positive-electrode mixture paste, is required to have a low viscosity. Under such circumstances, methods for adding a dispersant to allow a conductive auxiliary agent to be dispersed in a conductive paste or a dispersion liquid are known (Patent Literature 1 and Patent Literature 2). A method for using a specific vinyl alcohol-based polymer as a binder is also known (Patent Literature 3). However, a large amount of a dispersant and the like affects the battery performance (internal resistance, capacity); thus, the amount thereof used is restricted. Accordingly, a dispersant that is capable, with a small amount thereof, of reducing the viscosity of a conductive paste, has been in demand.

CITATION LIST

Patent Literature

PTL 1: JP2013-89485A
PTL 2: JP2014-193986A
PTL 3: JPH11-250915A

SUMMARY OF INVENTION

Technical Problem

The problem to be solved by the present invention is to provide a conductive paste for lithium-ion battery positive electrodes and a mixture paste for lithium-ion battery positive electrodes that have an easy-to-apply viscosity, even when a relatively small amount of a dispersion resin is incorporated.

Solution to Problem

Under such circumstances, the present inventors conducted extensive research, and found that the above problem can be solved by the use of a dispersion resin (A) containing a certain amount of a dispersion resin (A1), which has a specific structure. The present invention is accomplished based on such novel findings.

More specifically, the present invention provides the following Items:

Item 1. A conductive paste for lithium-ion battery positive electrodes, the conductive paste comprising a dispersion resin (A), conductive carbon (B), and a solvent (C),
the dispersion resin (A) containing a resin (A1),
the resin (A1) containing, as one constituent component, a polymerizable unsaturated group-containing monomer (A1-1) represented by the following formula (1):

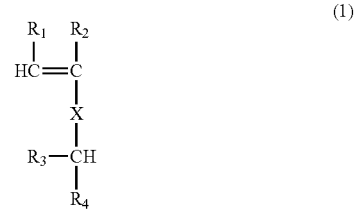

wherein $R_1$, $R_2$, $R_3$, and $R_4$ are identical or different, and each represents at least one member selected from the group consisting of hydrogen, hydrocarbon, hydroxyl, and methylol,
at least one of $R_1$, $R_2$, $R_3$, and $R_4$ is hydroxyl, and
X may or may not be present; when X is present, X is one or more atoms forming a linking chain.

Item 2. The conductive paste for lithium-ion battery positive electrodes according to Item 1, wherein the resin (A1) contains, as constituent components, the polymerizable unsaturated group-containing monomer (A1-1), a fatty acid vinyl ester (A1-2), and vinyl alcohol (A1-3), the polymerizable unsaturated group-containing monomer (A1-1) being contained in an amount of 0.1 to 20 mass %.

Item 3. The conductive paste for lithium-ion battery positive electrodes according to Item 1 or 2, wherein the dispersion resin (A) further contains a polymerizable unsaturated group-containing monomer (A1-1)-free polyvinyl alcohol resin (A2) having a saponification degree of 30 to 100 mol %, and wherein the resin (A1) and the resin (A2) are contained at a ratio of 40/60 to 90/10, based on the resin solids mass.

Item 4. The conductive paste for lithium-ion battery positive electrodes according to any one of Items 1 to 3, wherein the dispersion resin (A) further contains a polycyclic aromatic hydrocarbon group-containing resin (A3).

Item 5. The conductive paste for lithium-ion battery positive electrodes according to any one of Items 1 to 4, wherein the conductive carbon (B) comprises acetylene black.

Item 6. The conductive paste for lithium-ion battery positive electrodes according to any one of Items 1 to 5, wherein the conductive carbon (B) comprises graphite.

Item 7. The conductive paste for lithium-ion battery positive electrodes according to any one of Items 1 to 6, wherein the solvent (C) contains N-methyl-2-pyrrolidone.
Item 8. The conductive paste for lithium-ion battery positive electrodes according to any one of Items 1 to 7, wherein the conductive paste contains moisture in an amount of less than 1.0 mass %.
Item 9. A mixture paste for lithium-ion battery positive electrodes comprising the conductive paste of any one of Items 1 to 8, and further comprising an electrode active material.
Item 10. An electrode for lithium-ion battery positive electrodes, the electrode being obtained by using the mixture paste for lithium-ion battery positive electrodes of Item 9.
Item 11. A lithium-ion battery having the electrode for lithium-ion battery positive electrodes of Item 10.

Advantageous Effects of Invention

The dispersion resin (A) contained in the conductive paste for lithium-ion battery positive electrodes and the mixture paste for lithium-ion battery positive electrodes according to the present invention is, even in a relatively small amount, capable of sufficiently reducing the viscosity of the pastes, compared with resins for pigment dispersion previously used for conductive pastes or mixture pastes for lithium-ion battery positive electrodes.

DESCRIPTION OF EMBODIMENTS

Embodiments according to the present invention are described in detail below. However, the present invention is not limited to the following embodiments and includes various modifications of the embodiments as long as they do not depart from the scope of the invention.

In this specification, the term "(meth) acrylate" refers to acrylate and/or methacrylate, and the term "(meth)acrylic acid" refers to acrylic acid and/or methacrylic acid. The term "(meth)acryloyl" refers to acryloyl and/or methacryloyl. The term "(meth)acrylamide" refers to acrylamide and/or methacrylamide. The "polymerizable unsaturated monomer" refers to a polymerizable unsaturated group-containing monomer that is capable of undergoing radical polymerization. Examples of the polymerizable unsaturated group include (meth)acryloyl, acrylamide, vinyl, allyl, (meth)acryloyloxy, vinyl ether, and the like.

Conductive Paste for Lithium-Ion Secondary Battery Positive Electrodes

The present invention relates to a conductive paste for lithium-ion secondary battery positive electrodes, the conductive paste comprising a dispersion resin (A), conductive carbon (B), and a solvent (C). The conductive paste according to the present invention is characterized in that the dispersion resin (A) contains a resin (A1) containing, as one constituent unit, a polymerizable unsaturated group-containing monomer (A1-1) represented by the following formula (1).

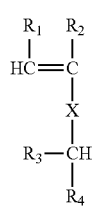

(1)

(In the formula, $R_1$, $R_2$, $R_3$, and $R_4$ are identical or different, and each represents at least one member selected from the group consisting of hydrogen, hydrocarbon, hydroxyl, and methylol, at least one of $R_1$, $R_2$, $R_3$, and $R_4$ is hydroxyl, and X may or may not be present; when X is present, X is one or more atoms forming a linking chain.)

Resin (A1)

The resin (A1) usable in the conductive paste of the present invention is obtained by copolymerization of a polymerizable unsaturated group-containing monomer (A1-1) represented by Formula (I) above and other polymerizable unsaturated monomers. In the present invention, a "resin containing, as one constituent component, a polymerizable unsaturated group-containing monomer (A1-1)" refers to a resin obtained by (co)polymerization of starting monomer materials comprising the polymerizable unsaturated group-containing monomer (A1-1). Similarly, in the present invention, a resin containing a monomer X "as a constituent component" refers to a resin obtained by (co)polymerization of the starting materials comprising the monomer X.

$R_1$, $R_2$, $R_3$, and $R_4$ in Formula (1) above representing the polymerizable unsaturated group-containing monomer (A1-1) are identical or different, and each represents at least one member selected from the group consisting of hydrogen, hydrocarbon, hydroxyl, and methylol, and at least one (e.g., preferably 1 to 3, and more preferably 2 to 3) of $R_1$, $R_2$, $R_3$, and $R_4$ is hydroxyl. X in Formula (1) above representing a monomer may or may not be present. When X is not present, it represents a single bond, and when X is present, X is one or more atoms forming a linking chain. Examples of the linking chain include, but are not particularly limited to, hydrocarbon groups, such as alkylene (e.g., $C_{1-6}$ linear or branched alkylene), alkenylene (e.g., $C_{2-6}$ linear or branched alkenylene having one to two (preferably one) double bonds), alkynylene (e.g., $C_{2-6}$ linear or branched alkynylene having one to two (preferably one) triple bonds), phenylene, naphthylene, and the like (these hydrocarbon groups may be substituted with halogen, such as fluorine, chlorine, and bromine). Examples also include —O—, —(R—O)$_m$—, —(O—R)$_m$—, —(R—O)$_m$—R—, —C(=O)—, —R(—OH)—, —C(=O)—O—, —R—C(=O)—O—, —C(=O)—O—R—, —C(=O)—N(—R)—, —C(=O)—N(—R)—R—, —R—C(=O)—N(—R)—, —R—C(=O)—N(—R)—R—, and the like (wherein each R represents an arbitrary substituent and preferably hydrogen or alkyl, and m is an integer of 1 or greater). Of these, the linking chain is preferably selected from a single bond (X is not present), a hydrocarbon group, an ester group [—C(=O)—O—], an amide group [—C(=O)—NH—], or an amidomethyl group [—C(=O)NH—CH$_2$—]], and more preferably a single bond (X is not present).

Specific examples of the monomer (A1-1) include hydroxy ethyl (meth)acrylate, a ring-opening product of glycidyl (meth) acrylate, 2-propen-1-ol, 1-propene-1,3-diol, 1-propen-2-ol, 2-methyl-2-propen-1-ol, 2-buten-1-ol, 2-methyl-2-buten-1-ol, 1-methyl-2-buten-1-ol, 2-butene-1,4-diol, 1-butene-3,4-diol, 2-methyl-2-butene-1,4-diol, 4-penten-2-ol, 3-penten-1-ol, 4-penten-2-ol, 4-penten-1-ol, 1-pentene-4,5-diol, 2-pentene-1,5-diol, N-hydroxymethyl (meth)acrylamide, N-hydroxyethyl (meth)acrylamide, N-hydroxyisopropyl (meth)acrylamide, N-(1-methyl-2-hydroxyethyl) (meth)acrylamide, 2,3-dihydroxypropyl (meth)acrylamide, 1,2-dihydroxyethyl (meth)acrylamide, and derivatives thereof. These may be used alone or in a combination of two or more. Of these, those having two or more hydroxyl groups are preferable. The total number of carbon atoms and oxygen atoms in X, $R_3$, and $R_4$ in Formula (1) representing the monomer (A1-1) is preferably 3 or more, and more preferably 4 or more.

The resin (A1) contains the polymerizable unsaturated group-containing monomer (A1-1) preferably in an amount within a range of 0.01 to 20 mass %, more preferably 0.1 to 15 mass %, and particularly preferably 0.5 to 10 mass %. In the present invention, "the amount of the polymerizable unsaturated group-containing monomer (A1-1) in the resin (A1)" refers to an amount of the polymerizable unsaturated group-containing monomer (A1-1) contained in a monomer mixture used as a starting material of the resin (A1). Therefore, when the polymerizable unsaturated group-containing monomer (A1-1) is contained in the resin (A1) in an amount of 0.1 to 20 mass %, this means that the resin (A1) is a copolymer of a starting monomer material comprising the polymerizable unsaturated group-containing monomer (A1-1) in an amount of 0.1 to 20 mass %. Similarly, "the amount of a monomer X in a resin Y" refers to an amount of the monomer X contained in a monomer mixture used as a starting material of the resin Y. Therefore, when a polymerizable unsaturated group-containing monomer X is contained in a resin Y in an amount of a mass %, this means that the resin Y is a copolymer of a starting monomer material comprising the monomer X in an amount of a mass %.

Other polymerizable unsaturated monomers that are copolymerized with the polymerizable unsaturated group-containing monomer (A1-1) are not particularly limited as long as they are capable of copolymerization with the monomer (A1-1). Specific examples thereof include fatty acid vinyl esters, such as vinyl acetate; olefin-based monomers, such as ethylene and propylene; (meth)acryloyl group-containing monomers, such as alkyl (meth)acrylate; allyl ethers, such as allyl glycidyl ether; halogenated vinyl-based compounds, such as vinyl chloride, vinylidene chloride, and vinyl fluoride; vinyl ethers, such as alkyl vinyl ether; and the like. These may be used alone or in a combination of two or more. Of these, a fatty acid vinyl ester (A1-2) is preferable. Specific examples of the fatty acid vinyl ester (A1-2) include vinyl formate, vinyl acetate, vinyl propionate, vinyl butyrate, vinyl caprate, vinyl caprylate, vinyl caproate, vinyl laurate, vinyl myristate, vinyl palmitate, vinyl stearate, vinyl pivalate, vinyl octylate, vinyl monochloro carboxilate, vinyl benzoate, vinyl cinnamate, vinyl crotonate, divinyl adipate, and derivatives thereof. Of these, vinyl acetate is preferable.

The resin (A1) obtained by copolymerization is preferably further subjected to saponification, so that all or part of fatty acid vinyl ester units are hydrolyzed to vinyl alcohol units, from the viewpoints of dispersibility and solubility. The saponification degree is preferably within a range of 50 to 100 mol %, more preferably 70 to 100 mol %, still more preferably 86 to 100 mol %, and particularly preferably 88 to 99.9 mol %. In other words, it is particularly preferable to saponify a copolymer of at least one polymerizable unsaturated group-containing monomer (A1-1) and at least one fatty acid vinyl ester (A1-2), so that the resin (A1) contains, as constituent components, the polymerizable unsaturated group-containing monomer (A1-1), the fatty acid vinyl ester (A1-2), and vinyl alcohol (A1-3).

In general, a high saponification degree (high polarity) achieves better adsorption to an inorganic pigment, such as carbon, while the solubility with a solvent (e.g., NMP) decreases, making it impossible to form a steric repelling layer, which results in insufficient dispersibility. However, in the present invention, the resin (A1) containing, as one constituent component, the polymerizable unsaturated group-containing monomer (A1-1) achieves a desirable effect on the dispersibility of the conductive paste. This is presumably because when specific functional groups are introduced to side chains of the resin, the relatively bulky side chain-functional groups cause steric hindrance to lower the melting point of the resin, and also because the hydrogen bonding of specific hydroxyl groups can reduce the crystallinity of the resin. These are believed to be the reasons why both the solubility in a solvent and adsorption to pigment are satisfied together.

Polymerization to obtain the resin (A1) may be performed by a known polymerization method. For example, the resin may be produced by performing solution polymerization in an organic solvent. The method, however, is not limited thereto, and, for example, bulk polymerization, emulsion polymerization, suspension polymerization, or the like is also applicable. In solution polymerization, either continuous polymerization or batch polymerization may be performed, monomers may be added all at once or in divided portions, and the addition may be performed successively or intermittently.

The polymerization initiator used in solution polymerization is not particularly limited. Specifically, the following known radical polymerization initiators may be used: azo compounds, such as azobisisobutyronitrile, azobis-2,4-dimethylvaleronitrile, and azobis(4-methoxy-2,4-dimethylvaleronitrile); peroxides, such as acetyl peroxide, benzoyl peroxide, lauroyl peroxide, acetylcyclohexylsulfonyl peroxide, and 2,4,4-trimethylpentyl-2-peroxyphenoxyacetate; percarbonate compounds, such as diisopropyl peroxydicarbonate, di-2-ethylhexyl peroxydicarbonate, and diethoxyethyl peroxydicarbonate; perester compounds, such as t-butylperoxy neodecanoate, α-cumylperoxy neodecanoate, and t-butylperoxy neodecanoate; azobis dimethylvaleronitrile; azobis methoxyvaleronitrile; and the like.

The polymerization reaction temperature is not particularly limited, and may be usually set within a range of about 30 to 200° C.

The saponification conditions when performed are not particularly limited, and saponification may be performed by a known method. For example, saponification may be performed by hydrolyzing an ester moiety in a molecule in an alcohol solution, such as methanol, in the presence of an alkali catalyst or an acid catalyst. The alkali catalyst may be, for example, an alkali metal hydroxide, such as sodium hydroxide, potassium hydroxide, sodium methylate, sodium ethylate, and potassium methylate; alcoholate; and the like. The acid catalyst may be, for example, an aqueous solution of an inorganic acid, such as hydrochloric acid and sulfuric acid, and an organic acid, such as p-toluenesulfonic acid. It is desirable to use sodium hydroxide. The saponification reaction temperature is not particularly limited, and is preferably within a range of 10 to 70° C., and more preferably 30 to 40° C. The reaction time is not particularly limited, and is desirably within a range of 30 minutes to 3 hours.

After the completion of the synthesis, the resin (A1) may be subjected to solvent removal and/or solvent replacement to obtain a solid or a resin solution whose solvent has been replaced with an arbitrary solvent. The replacement solvent is preferably N-methyl-2-pyrrolidone, N-ethyl-2-pyrrolidone, propylene glycol monomethyl ether, an alcohol-based solvent, and the like. The method for solvent removal may be performed by heating at ordinary pressure. Solvent removal may also be performed under reduced pressure. For solvent replacement, a replacement solvent may be introduced at any step of before, during, or after solvent removal.

Polymerizable Unsaturated Group-Containing Monomer (A1-1)-Free Polyvinyl Alcohol Resin (A2)

The dispersion resin (A), which is usable in the conductive paste of the present invention, may contain a polymerizable unsaturated group-containing monomer (A1-1)-free polyvinyl alcohol resin (A2) having a saponification degree of 30 to 100 mol %. In the present invention, the "polymerizable unsaturated group-containing monomer (A1-1)-free polyvinyl alcohol resin" refers to a polyvinyl alcohol resin obtained by (co)polymerization of a starting monomer material that does not comprise the polymerizable unsaturated group-containing monomer (A1-1).

The polyvinyl alcohol resin (A2) may be obtained by a known polymerization method, for example, by polymerization of a fatty acid vinyl ester represented by vinyl acetate, followed by hydrolyzation.

The fatty acid vinyl ester is desirably one or more fatty acid vinyl esters exemplified above in relation to the fatty acid vinyl ester (A1-2), with vinyl acetate being preferable.

The polyvinyl alcohol resin (A2) may be obtained by copolymerization with a polymerizable unsaturated monomer other than fatty acid vinyl esters. (However, the monomers are limited to those other than the polymerizable unsaturated group-containing monomer (A1-1).)

Polymerizable unsaturated monomers that are capable of being copolymerized with a fatty acid vinyl ester are not particularly limited as long as they are monomers other than the polymerizable unsaturated group-containing monomer (A1-1). Examples thereof include olefin-based monomers, such as ethylene and propylene; (meth)acryloyl group-containing monomers, such as alkyl (meth)acrylate, 2-hydroxyethyl (meth)acrylate, and glycidyl (meth)acrylate; allyl ethers, such as allyl glycidyl ether; halogenated vinyl compounds, such as vinyl chloride, vinylidene chloride, and vinyl fluoride; vinyl ethers, such as alkyl vinyl ether and 4-hydroxyvinyl ether; and the like. These may be used alone, or in a combination of two or more.

The following describes the present invention, mainly referring to vinyl acetate; however, the present invention is not limited thereto.

Polymerization to obtain the polyvinyl alcohol resin (A2) may be performed by known polymerization methods. For example, a polyvinyl alcohol resin may be produced by subjecting vinyl acetate to solution polymerization in an alcohol-based organic solvent to produce polyvinyl acetate, followed by saponification thereof. The methods are not limited to the above, and, for example, bulk polymerization, emulsion polymerization, suspension polymerization, or the like is also applicable. In solution polymerization, either continuous polymerization or batch polymerization may be performed, monomers may be added all at once or in divided portions, and the addition may be performed successively or intermittently.

The polymerization initiator used in solution polymerization is not particularly limited. Specifically, the following known radical polymerization initiators may be used: azo compounds, such as azobisisobutyronitrile, azobis-2,4-dimethylvaleronitrile, and azobis(4-methoxy-2,4-dimethylvaleronitrile); peroxides, such as acetyl peroxide, benzoyl peroxide, lauroyl peroxide, acetylcyclohexylsulfonyl peroxide, and 2,4,4-trimethylpentyl-2-peroxyphenoxyacetate; percarbonate compounds, such as diisopropyl peroxydicarbonate, di-2-ethylhexyl peroxydicarbonate, and diethoxyethyl peroxydicarbonate; perester compounds, such as t-butylperoxy neodecanoate, α-cumylperoxy neodecanoate, and t-butylperoxy neodecanoate; azobis dimethylvaleronitrile; azobis methoxyvaleronitrile; and the like.

The polymerization reaction temperature is not particularly limited, and may be usually set within a range of about 30 to 200° C.

The saponification conditions in the production of the polyvinyl alcohol resin (A2) are not particularly limited, and saponification may be performed by a known method. In general, saponification may be performed by hydrolyzing an ester moiety in a molecule in an alcohol solution, such as methanol, in the presence of an alkali catalyst or an acid catalyst. The alkali catalyst may be, for example, an alkali metal hydroxide, such as sodium hydroxide, potassium hydroxide, sodium methylate, sodium ethylate, and potassium methylate; alcoholate; and the like. The acid catalyst may be, for example, an aqueous solution of an inorganic acid, such as hydrochloric acid and sulfuric acid; and an organic acid, such as p-toluenesulfonic acid. It is desirable to use sodium hydroxide. The saponification reaction temperature is not particularly limited, and is preferably within a range of 10 to 70° C., and more preferably 30 to 40° C. The reaction time is not particularly limited, and is desirably within a range of 30 minutes to 3 hours.

The thus-obtained polyvinyl alcohol resin preferably has a polymerization degree of 100 to 4,000, and more preferably 100 to 3,000. Further, the saponification degree is usually within a range of 30 to 100 mol %, and preferably 32 to 85 mol %. In the present invention, the saponification degree of polyvinyl alcohol resin refers to the percentage (mol %) of hydrolyzed ester bonds in the structural units derived from fatty acid vinyl ester contained in the polyvinyl alcohol resin (A2). The saponification degree may be measured by completely saponifying a polyvinyl alcohol resin with an alkaline substance, such as sodium hydroxide, and measuring the amount of the obtained fatty acid salt (e.g., acetate salt) (whether saponification is perfectly completed may be confirmed by infrared absorption spectrometry). The polyvinyl alcohol resin (A2) may be a commercially available product.

After the completion of the synthesis, the polyvinyl alcohol resin (A2) may be subjected to solvent removal and/or solvent replacement to obtain a solid or a resin solution whose solvent has been replaced with an arbitrary solvent. The replacement solvent is preferably N-methyl-2-pyrrolidone, N-ethyl-2-pyrrolidone, propylene glycol monomethyl ether, an alcohol-based solvent, and the like. The method for solvent removal may be performed by heating at ordinary pressure. Solvent removal may also be performed under reduced pressure. For solvent replacement, a replacement solvent may be introduced at any step of before, during, or after solvent removal.

In the conductive paste of the present invention, the resin (A1) of high polarity and the polyvinyl alcohol resin (A2) of relatively low polarity are used in combination. In this manner, the resins become compatible to each other, and this resin mixture is believed to achieve both more satisfactory solvent solubility and pigment adsorption together.

When the resins (A1) and (A2) are contained in the dispersion resin (A), the ratio of the resins (A1)/(A2) is usually within a range of 40/60 to 90/10, and preferably 50/50 to 80/20, based on the total resin solids content, in view of the solubility in a solvent, pigment dispersibility, and/or battery performance.

Polycyclic Aromatic Hydrocarbon Group-Containing Resin (A3)

The polycyclic aromatic hydrocarbon group-containing resin (A3) usable in the conductive paste of the present invention is characterized in that it is obtained by copolymerization of a monomer mixture comprising a polycyclic aromatic hydrocarbon group-containing monomer (A3-1) in an amount of 1 to 70 mass %, based on the total solids content of the monomer mixture. Therefore, in the present invention, the resin (A3) may be rephrased as a copolymer of a monomer mixture comprising a polycyclic aromatic hydrocarbon group-containing monomer (A3-1) in an amount of 1 to 70 mass %, based on the total solids content of the monomer mixture.

Examples of the types of resin (A3) include acrylic resins, polyester resins, epoxy resins, polyether resins, alkyd resins, urethane resins, silicone resins, polycarbonate resins, silicate resins, chlorine-based resins, fluorine-based resins, and composite resins thereof. In particular, acrylic resins are preferable.

In this specification, the term "derivative" refers to a compound obtained by modifying a small portion (or small portions) in the molecule of a compound by functional group introduction, atomic substitution, or other chemical reactions. For example, a compound obtained by introducing one or more functional groups, such as alkyl, alkoxy, hydroxyl, sulfonic acid, carboxyl, amino, nitro, halogen, aryloxy, alkylthio, and arylthio, into naphthalene is referred to as a naphthalene derivative.

Polycyclic Aromatic Hydrocarbon Group-Containing Monomer (A3-1)

Examples of the polycyclic aromatic hydrocarbon of the polycyclic aromatic hydrocarbon group-containing monomer (A3-1) usable in the resin for pigment dispersion according to the present invention include a naphthalene ring-, anthracene ring-, triphenylene ring-, tetraphene ring-, tetracene ring-, chrysene ring-, pyrene ring-, pentacene ring-, hexacene ring-, heptacene ring-, coronene ring-, or kekulene ring-containing hydrocarbon group, and derivatives thereof. In a preferable embodiment according to the present invention, the polycyclic aromatic hydrocarbon group-containing monomer (A3-1) may be a polymerizable unsaturated monomer that contains a naphthalene ring-containing hydrocarbon group from among the polycyclic aromatic hydrocarbon groups mentioned above, i.e., a naphthyl-containing polymerizable unsaturated monomer or a derivative thereof (A3-2). Examples of the naphthyl-containing polymerizable unsaturated monomer or a derivative thereof (A3-2) include a naphthyl-containing polymerizable unsaturated monomer represented by Formula (3) below or a derivative thereof (A3-1-2), and the like.

The polycyclic aromatic hydrocarbon group-containing monomer (A3-1) is preferably a polycyclic aromatic hydrocarbon group-containing polymerizable unsaturated monomer (A3-1-1) represented by the following Formula (2).

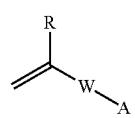

Formula (2)

(In the formula, R is hydrogen or methyl, A is polycyclic aromatic hydrocarbon, and W may or may not be present; when W is present, W is an organic group having 1 to 20 carbon, nitrogen, and/or oxygen atoms, and when W is not present, W directly binds to A). The "polymerizable unsaturated monomer" refers to a polymerizable unsaturated group-containing monomer that is capable of undergoing radical polymerization. Examples of the polymerizable unsaturated group include (meth)acryloyl, acrylamide, vinyl, allyl, (meth)acryloyloxy, vinyl ether, and the like.

Specific examples of the polycyclic aromatic hydrocarbon group-containing polymerizable unsaturated monomer (A3-1-1) include vinylnaphthalene, naphthyl(meth)acrylate, naphthyl alkyl(meth)acrylate, vinylanthracene, anthracenyl (meth)acrylate, anthracenyl alkyl(meth)acrylate, vinylpyrene, pyrenyl(meth)acrylate, pyrenyl alkyl(meth)acrylate, vinylchrysene, vinylnaphthacene, vinylpentacene, and derivatives thereof. Examples also include a reaction product obtained by reacting a polymerizable unsaturated monomer containing a reactive functional group, such as glycidyl or isocyanate, with a polycyclic aromatic hydrocarbon group containing a functional group that reacts with such a reactive functional group. Any combination of functional groups is suitably used as long as they react with each other. A more preferable combination includes a combination of a carboxyl group and a glycidyl group, a combination of an amino group and a glycidyl group, and a combination of a hydroxyl group and an isocyanate group. Specific examples include a combination of glycidyl(meth)acrylate and 1-naphthyl acetic acid, a combination of 2-(meth)acryloyloxyethyl isocyanate and 1-naphthol, a combination of 2-(meth)acryloyloxyethyl isocyanate and 1-(2-naphthyl)ethanol, and the like. These may be used alone, or in a combination of two or more.

Of these, the polycyclic aromatic hydrocarbon group-containing polymerizable unsaturated monomer (A3-1-1) is preferably a naphthyl-containing polymerizable unsaturated monomer represented by the following Formula (3) or a derivative thereof (A3-1-2).

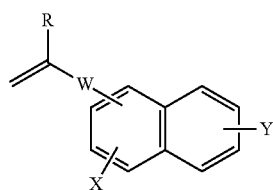

Formula (3)

(In the formula, R is hydrogen or methyl, and X and Y may be identical or different, and each represents hydrogen, alkyl, alkoxy, alkoxycarbonyloxy, phosphoryloxy, hydroxyl, sulfonic acid, carboxyl, amino, nitro, halogen, aryloxy, alkylthio, or arylthio; when W is present, W is an organic group having 1 to 20 carbon, nitrogen, and/or oxygen atoms).

Examples of the naphthyl-containing polymerizable unsaturated monomer or a derivative thereof (A3-1-2) include vinylnaphthalene, naphthyl(meth)acrylate, naphthylalkyl(meth)acrylate, derivatives thereof, and the like. These may be used alone, or in a combination of two or more.

Of these, naphthyl(meth)acrylate or a derivative thereof (A3-1-2) is preferably a naphthyl(meth)acrylate represented by the following Formula (4) or a derivative thereof (A3-1-3).

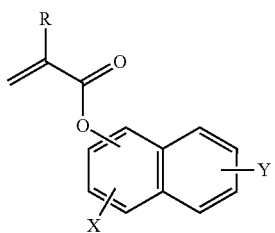

Formula (4)

(In the formula, R is hydrogen or methyl, X and Y may be identical or different, and each represents hydrogen, alkyl, alkoxy, hydroxyl, sulfonic acid, carboxyl, alkoxy carbonyloxy, phosphoryloxy, amino, nitro, halogen, aryloxy, alkylthio, or arylthio.)

Examples of the naphthyl(meth)acrylate or a derivative thereof (A3-1-3) include 1-naphthyl(meth)acrylate, 2-naphthyl(meth)acrylate, derivatives thereof, and the like. These may be used alone, or in a combination of two or more.

Of these, the naphthyl(meth)acrylate or a derivative thereof (A3-1-3) is preferably 4-substituted-1-naphthyl (meth)acrylate (A3-1-4) represented by the following Formula (5).

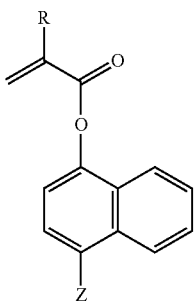

Formula (5)

(In the formula, R is hydrogen or methyl, and Z is hydroxyl or $C_{1-8}$ alkoxy.)

When Z, which is a substituent in Formula (5) above, is alkoxy, the carbon number of the alkoxy group is usually 1 to 8, preferably 1 to 4, more preferably 1 to 2, and particularly preferably 1.

Examples of the 4-substituted-1-naphthyl(meth)acrylate (A3-1-4) include 4-methyl-1-naphthyl(meth)acrylate, 4-ethyl-1-naphthyl(meth)acrylate, 4-methoxy-1-naphthyl (meth)acrylate, 4-ethoxy-1-naphthyl(meth)acrylate, 4-hydroxy-1-naphthyl(meth)acrylate, 2-methoxy-4-hydroxy-1-naphthyl(meth)acrylate, 2-ethoxy-4-hydroxy-1-naphthyl (meth)acrylate, 2-hydroxy-4-methoxy-1-naphthyl(meth) acrylate, 2-hydroxy-4-ethoxy-1-naphthyl(meth)acrylate, 4-methoxycarbonyloxy-1-naphthyl(meth)acrylate, 4-phenoxycarbonyloxy-1-naphthyl(meth)acrylate, 4-phosphoryloxy-1-naphthyl(meth)acrylate, and derivatives thereof. These may be used alone, or in a combination of two or more.

It is unknown specifically why the polycyclic aromatic hydrocarbon group-containing resin for pigment dispersion of the present invention is effective in terms of the dispersibility and stability of pigment. For example, a pigment that has an aromatic ring becomes stable presumably due to n-n interactions between the pigment and a resin for pigment dispersion. The n-n interactions refer to dispersion force between aromatic rings, and are also called stacking interactions since two aromatic rings become stable when disposed as if coins are stacked.

It is unknown specifically why the substituent of the 4-substituted-1-naphthyl(meth)acrylate (A3-1-4) is effective in terms of the dispersibility and stability of a pigment. For example, having a substituent presumably increases the electrostatic potential of an aromatic ring, increasing the affinity with a pigment.

Polymerizable Unsaturated Monomers Other than the Polycyclic Aromatic Hydrocarbon Group-Containing Polymerizable Unsaturated Monomer (A3-1)

The resin (A3) usable in the present invention is obtained by copolymerization of the polycyclic aromatic hydrocarbon group-containing polymerizable unsaturated monomer (A3-1) and a polymerizable unsaturated monomer other than (A3-1). The polymerizable unsaturated monomer other than the polycyclic aromatic hydrocarbon group-containing polymerizable unsaturated monomer (A3-1) is not particularly limited as long as it is usually used in the synthesis of acrylic resin. Examples include alkyl (meth)acrylates of 3 carbon atoms or less, such as methyl (meth)acrylate, ethyl (meth)acrylate, n-propyl (meth)acrylate, and isopropyl (meth)acrylate; alkyl or cycloalkyl (meth)acrylates, such as n-butyl (meth)acrylate, i-butyl (meth)acrylate, t-butyl (meth)acrylate, n-hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth) acrylate, isostearyl (meth)acrylate, cyclohexyl (meth) acrylate, methylcyclohexyl (meth)acrylate, t-butylcyclohexyl (meth)acrylate, cyclododecyl (meth)acrylate, and tricyclodecanyl (meth)acrylate;

isobornyl-containing polymerizable unsaturated compounds, such as isobornyl (meth)acrylate;

adamantyl-containing polymerizable unsaturated compounds, such as adamantyl (meth)acrylate;

aromatic-ring-containing polymerizable unsaturated monomers, such as benzyl (meth)acrylate, styrene, α-methylstyrene, and vinyltoluene;

hydroxy-containing polymerizable unsaturated monomers, such as monoesterified products of (meth)acrylic acids with dihydric alcohols having 2 to 8 carbon atoms (such as 2-hydroxyethyl(meth)acrylate, 2-hydroxypropyl(meth)acrylate, 3-hydroxypropyl(meth)acrylate, and 4-hydroxybutyl (meth)acrylate), ε-caprolactone-modified compounds of these monoesterified products of (meth)acrylic acids with dihydric alcohols having 2 to 8 carbon atoms, N-hydroxymethyl(meth)acrylamide, allyl alcohol, and (meth)acrylates having hydroxy-terminated polyoxyalkylene chains;

carboxy-containing polymerizable unsaturated monomers, such as (meth)acrylic acid, maleic acid, crotonic acid, and β-carboxyethyl acrylate;

nitrogen-containing polymerizable unsaturated monomers having no urethane bond, such as (meth)acrylonitrile, (meth) acrylamide, N,N-dimethylaminoethyl (meth)acrylate, N,N-diethylaminoethyl (meth)acrylate, N,N-dimethylaminopropyl (meth)acrylamide, and addition products of glycidyl (meth)acrylate with amine compounds;

urethane bond-containing polymerizable unsaturated monomers, such as a reaction product of an isocyanate-containing polymerizable unsaturated monomer and a hydroxy-containing compound, and a reaction product of a hydroxy-containing polymerizable unsaturated monomer and an isocyanate-containing compound;

epoxy-containing polymerizable unsaturated monomers, such as glycidyl (meth)acrylate, β-methylglycidyl (meth) acrylate, 3,4-epoxycyclohexylmethyl (meth)acrylate, 3,4- epoxycyclohexylethyl (meth)acrylate, 3,4-epoxycyclohexylpropyl (meth)acrylate, and allyl glycidyl ether;
(meth)acrylates having alkoxy-terminated polyoxyethylene chains; sulfonic acid group-containing polymerizable unsaturated monomers, such as 2-acrylamido-2-methylpropane-sulfonic acid, 2-sulfoethyl (meth)acrylate, allylsulfonic acid, and 4-styrenesulfonic acid, and sodium salts and ammonium salts of these sulfonic acids;
phosphoric acid group-containing polymerizable unsaturated monomers, such as 2-acryloyloxyethyl acid phosphate, 2-methacryloyloxyethyl acid phosphate, 2-acryloyloxypropyl acid phosphate, and 2-methacryloyloxypropyl acid phosphate;
alkoxysilyl-containing polymerizable unsaturated monomers, such as vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane;
perfluoroalkyl (meth)acrylates, such as perfluorobutylethyl (meth)acrylate, and perfluorooctylethyl (meth)acrylate; fluorinated alkyl-containing polymerizable unsaturated monomers, such as fluoroolefins;
polymerizable unsaturated monomers having a photo-polymerizable functional group, such as maleimide;
(meth)acrylates having alkoxy-terminated polyoxyethylene chains;
polymerizable unsaturated monomers having two or more polymerizable unsaturated groups per molecule, such as allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylol propane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate, and divinylbenzene; and the like.
These may be used alone, or in a combination of two or more.

Of these, it is preferable to contain at least one styrene, and it is more preferable to contain styrene in an amount of 5 to 65 mass %, based on the total amount of the polymerizable unsaturated monomer components.

To form a steric repelling layer of the resin and achieve the stability of pigment dispersion paste, it is preferable to contain at least one polyalkylene glycol macromonomer, and it is more preferable to contain polyalkylene glycol macromonomer in an amount of 1 to 30 mass %, based on the total amount of the polymerizable unsaturated monomer components.

The polyalkylene glycol macromonomer is a nonionic polymerizable unsaturated monomer represented by the following formula (6). Specific examples of such a monomer include polyethylene glycol (meth)acrylate, polypropylene glycol (meth)acrylate, methoxy polyethylene glycol(meth)acrylate, ethoxy polyethylene glycol(meth)acrylate, and the like. Of these, in particular, polyethylene glycol(meth)acrylate and polypropylene glycol(meth)acrylate are preferable.

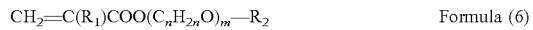

$$CH_2=C(R_1)COO(C_nH_{2n}O)_m-R_2 \quad \text{Formula (6)}$$

(wherein $R_1$ is hydrogen or methyl, $R_2$ is hydrogen or $C_{1-4}$ alkyl, m is an integer of 4 to 60, in particular 4 to 55, and n is an integer of 2 to 3; in the formula, m-number of oxyalkylene units ($C_nH_{2n}O$) may be the same or different.)

It is also preferable to contain at least one (meth)acrylamide compound. As the (meth)acrylamide compound, known compounds may be used without particular limitation. Specific examples include acrylamide, methacrylamide, 2-acrylamide-2-methylpropanesulfonic acid, N-methylacrylamide, N-methylmethacrylamide, N-methylol acrylamide butyl ether, N-methylol methacrylamide butyl ether, N-ethylacrylamide, N-ethylmethacrylamide, N-n-propylacrylamide, N-n-propylmethacrylamide, N-isopropylacrylamide, N-isopropylmethacrylamide, N-cyclopropylacrylamide, N-cyclopropylmethacrylamide, diacetone acrylamide, diacetone methacrylamide, N-hydroxymethylacrylamide, N-hydroxymethylmethacrylamide, N-hydroxyethylacrylamide, N-hydroxypropyl acrylamide, N-hydroxybutyl acrylamide, N-hydroxypentyl acrylamide, N-hydroxymethyl-N-ethyl acrylamide, N-methyl-N-hydroxyethyl acrylamide, N,N-dihydroxymethyl acrylamide, N,N-dihydroxyethyl acrylamide, N,N-dihydroxypropyl acrylamide, N,N-dihydroxybutyl acrylamide, N,N-dihydroxypentyl acrylamide, N-hydroxymethyl methacrylamide, N-hydroxyethyl methacrylamide, N-hydroxypropyl methacrylamide, N-hydroxybutyl methacrylamide, N-hydroxypentyl methacrylamide, N-hydroxymethyl-N-ethyl methacrylamide, N-methyl-N-hydroxyethyl methacrylamide, N,N-dihydroxymethyl methacrylamide, N,N-dihydroxyethyl methacrylamide, N,N-dihydroxypropyl methacrylamide, N,N-dihydroxybutyl methacrylamide, N,N-dihydroxypentyl methacrylamide, N,N-dihydroxybutyl (meth)acrylamide, N-[tris(hydroxymethyl)methyl]acrylamide, N,N-dimethylacrylamide, N,N-dimethylmethacrylamide, N,N-diethylacrylamide, N,N-diethylmethacrylamide, N-methyl-N-ethylacrylamide, N-methyl-N-ethylmethacrylamide, N-methylol acrylamide methyl ether, N-methylol methacrylamide methyl ether, N-methylol acrylamide ethyl ether, N-methylol methacrylamide ethyl ether, N-methylol acrylamide propyl ether, N-methylol methacrylamide propyl ether, N-methylol acrylamide butyl ether, N-methylol methacrylamide butyl ether, N,N-dimethylaminoethyl (meth)acrylamide, N,N-dimethylaminopropyl (meth)acrylamide, N,N-diethylaminoethyl (meth)acrylamide, N,N-dipropylaminoethyl (meth)acrylamide, and like amino-containing (meth)acrylamide compounds, methacryloyloxyethyl trimethyl ammonium chloride (Acryester DMC, trade name, produced by Mitsubishi Rayon Co., Ltd.) and like quaternary-ammonium-base-containing acrylamide compounds, acryloyl morpholine, and the like. These may be used alone, or in a combination of two or more.

Of these, it is preferable to use a (meth)acrylamide compound represented by the following formula (7):

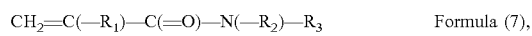

$$CH_2=C(-R_1)-C(=O)-N(-R_2)-R_3 \quad \text{Formula (7)},$$

$R_1$ in Formula (7) is hydrogen or methyl, $R_2$ and $R_3$ may be identical or different, and each may preferably be at least one member selected from a hydrogen atom, hydroxy-containing organic group, or alkyl group. Further, it is more preferable that both or one of $R_2$ and $R_3$ represent a hydroxy-containing organic group. Specifically, for example, at least one member selected from N-hydroxymethyl(meth)acrylamide, N-hydroxyethyl(meth)acrylamide, N-hydroxypropyl(meth)acrylamide, N-hydroxybutyl(meth)acrylamide, hydroxymethyl-N-ethyl(meth)acrylamide, N-methyl-N-hydroxyethyl (meth)acrylamide, N-ethyl-N-hydroxyethyl(meth)acrylamide, hydroxyethyl-N-butyl(meth)acrylamide, N-hydroxybutyl-N-butyl (meth)acrylamide, N,N-dihydroxymethyl(meth)acrylamide, N,N-dihydroxyethyl (meth)acrylamide, N,N-dihydroxypropyl (meth)acrylamide, N,N-dihydroxybutyl (meth)acrylamide, or N-[tris(hydroxymethyl)methyl]acrylamide is particularly preferable.

Synthesis of Dispersion Resin (A3)

The polycyclic aromatic hydrocarbon group-containing resin (A3) usable in the conductive paste of the present invention may be obtained by a known radical-polymerization method, such as solution polymerization in an organic solvent in the presence of a radical polymerization initiator, or emulsion polymerization in an aqueous medium in the presence of a radical polymerization initiator.

Examples of radical polymerization initiators used in polymerization include cyclohexanone peroxide, 3,3,5-trimethylcyclohexanone peroxide, methylcyclohexanone peroxide, 1,1-bis(tert-butylperoxy)-3,3,5-trimethylcyclohexane, 1,1-bis(tert-butylperoxy)cyclohexane, n-butyl-4,4-bis(tert-butylperoxy)valerate, cumenehydro peroxide, 2,5-dimethylhexane-2,5-dihydroperoxide, 1,3-bis(tert-butylperoxy-m-isopropyl)benzene, 2,5-dimethyl-2,5-di(tert-butylperoxy)hexane, diisopropylbenzene peroxide, tert-butylcumyl peroxide, decanoyl peroxide, lauroyl peroxide, benzoyl peroxide, 2,4-dichlorobenzoyl peroxide, di-tert-amyl peroxide, bis(tert-butylcyclohexyl)peroxydicarbonate, tert-butylperoxy benzoate, 2,5-dimethyl-2,5-di(benzoylperoxy)hexane, tert-butyl peroxy-2-ethylhexanoate, and like peroxide-based polymerization initiators; and 2,2'-azobis(isobutyronitrile), 1,1-azobis(cyclohexane-1-carbonitrile), azocumene, 2,2'-azobis(2-methylbutyronitrile), 2,2'-azobis dimethylvaleronitrile, 4,4'-azobis(4-cyanovaleric acid), 2-(t-butylazo)-2-cyanopropane, 2,2'-azobis(2,4,4-trimethylpentane), 2,2'-azobis (2-methylpropane), dimethyl 2,2'-azobis(2-methylpropionate), and like azo-based polymerization initiators. These may be used alone, or in a combination of two or more.

The solvents used in the above polymerization or dilution are not particularly limited, and water, an organic solvent, and a mixture thereof may be used. Examples of organic solvents include hydrocarbon solvents, such as n-butane, n-hexane, n-heptane, n-octane, cyclopentane, cyclohexane, and cyclobutane; aromatic-based solvents, such as toluene and xylene; ketone-based solvents, such as methyl isobutyl ketone; ether-based solvents, such as n-butyl ether, dioxane, ethylene glycol monomethyl ether, ethylene glycol monoethyl ether, ethylene glycol monoethyl ether, ethylene glycol monobutyl ether, and diethylene glycol; ester-based solvents, such as ethyl acetate, n-butyl acetate, isobutyl acetate, ethylene glycol monomethyl ether acetate, and butylcarbitol acetate; ketone-based solvents, such as methyl ethyl ketone, methyl isobutyl ketone, and diisobutyl ketone; alcohol-based solvents, such as ethanol, isopropanol, n-butanol, sec-butanol, and isobutanol; amide-based solvents, such as Equamide (trade name, produced by Idemitsu Kosan Co., Ltd., amide-based solvent), N,N-dimethylformamide, N,N-dimethylacetamide, N-methylformamide, N-methylacetamide, N-methylpropionamide, N-methyl-2-pyrrolidone; and other known solvents. These may be used alone or in a combination of two or more.

In solution polymerization in an organic solvent, for example, a method comprising mixing a polymerization initiator, polymerizable unsaturated monomer components, and an organic solvent, and performing heating while stirring may be used; as well as a method comprising introducing an organic solvent in a reaction vessel to prevent an increase in the temperature of the system due to the reaction heat, and adding polymerizable unsaturated monomer components and a polymerization initiator dropwise separately or in combination over a predetermined time with stirring at a temperature of 60 to 200° C. while optionally blowing an inert gas, such as nitrogen and argon.

In general, polymerization may be performed for about 1 to 10 hours. After polymerization of each step, an additional catalyst step may also be performed that comprises heating a reaction vessel, while optionally adding a polymerization initiator dropwise.

The resin for pigment dispersion of the present invention obtained as above has a weight average molecular weight within a range of preferably 1,000 to 100,000, and more preferably 3,000 to 50,000.

After the completion of the synthesis, the resin (A3) may be subjected to solvent removal and/or solvent replacement to obtain a solid or a resin solution whose solvent has been replaced with an arbitrary solvent. The replacement solvent is preferably N-methyl-2-pyrrolidone, 1V-ethyl-2-pyrrolidone, propylene glycol monomethyl ether, an alcohol-based solvent, and the like. The method for solvent removal may be performed by heating at ordinary pressure. Solvent removal may also be performed under reduced pressure. For solvent replacement, a replacement solvent may be introduced at any step of before, during, or after solvent removal.

In this specification, the number average molecular weight and weight average molecular weight are a polystyrene equivalent molecular weight that is determined from the retention time (retention volume) measured by gel permeation chromatography (GPC) based on the retention time (retention volume) of a standard polystyrene with a known molecular weight measured under the same conditions. More specifically, the measurement is performed using a gel permeation chromatography apparatus (HLC8120GPC (trade name) produced by Tosoh Corporation) together with four columns (TSKgel G-4000HXL, TSKgel G-3000HXL, TSKgel G-2500HXL, and TSKgel G-2000XL, trade names, all produced by Tosoh Corporation) under the following conditions: mobile phase: tetrahydrofuran; measurement temperature: 40° C.; flow rate: 1 mL/min; and detector: RI.

When contained in the dispersion resin (A), the ratio of the resins (A1), (A2), and (A3) is preferably such that the resin (A1) is usually contained in an amount of 10 to 95 mass %, and preferably 30 to 80 mass %, the resin (A2) is usually contained in an amount of 1 to 50 mass %, and preferably 5 to 30 mass %, and the resin (A3) is usually contained in an amount of 1 to 70 mass %, and preferably 10 to 50 mass %, based on the total resin solids content, in view of the solubility in a solvent, dispersibility, and battery performance.

Other Resins

The dispersion resin (A) may optionally contain a resin other than the resin (A1), resin (A2), and resin (A3). Examples include acrylic resins, polyester resins, epoxy resins, polyether resins, alkyd resins, urethane resins, silicone resins, polycarbonate resins, silicate resins, chlorine-based resins, fluorine-based resins, polyvinylpyrrolidone resins, polyvinyl alcohol resins, polyvinyl acetal resins, composite resins thereof, and the like, other than the resin (A1), resin (A2), and resin (A3). These resins may be used alone, or in a combination of two or more. Of these, a combined use with at least one resin selected from polyvinyl acetal resins, polyvinyl pyrrolidone resins, polyvinyl alcohol resins, or fluororesins is preferable, and a combined use with polyvinylidene fluoride (PVDF) is more preferable. These resins may be incorporated into a conductive paste as a resin for pigment dispersion or as a resin added after pigment dispersion.

Conductive Carbon (B)

Examples of the conductive carbon (B) include acetylene black, furnace black, thermal black, channel black, Ketjen black, Vulcan, carbon nanotube, graphene, vapor growth carbon fiber (VGCF), graphite, and the like, with acetylene black, graphite, and the like being preferable, and acetylene black and the like being more preferable. In a preferable embodiment according to the present invention, the conductive carbon (B) may comprise both acetylene black and graphite. These conductive carbon materials may be used alone, or in a combination of two or more.

Solvent (C)

As the solvent (C), the solvents that are used in the polymerization to obtain the polycyclic aromatic hydrocarbon group-containing resin (A3) described above or dilution may be suitably used. Specific preferable examples of the solvent (C) include N-methyl-2-pyrrolidone, N-ethyl-2-pyrrolidone, propylene glycol monomethyl ether, methanol, and the like, with N-methyl-2-pyrrolidone being preferable. These solvents may be used alone, or in a combination of two or more. The conductive paste of the present invention contains moisture preferably in an amount of less than 1.0 mass %, more preferably less than 0.7 mass %, and still more preferably less than 0.5 mass %, based on the total amount of the paste. In the present invention, the moisture content in the conductive paste is measured by Karl Fischer coulometric titration. Specifically, the measurement may be performed by using a Karl-Fischer moisture titrator (produced by Kyoto Electronics Manufacturing Co., Ltd., product name: MKC-610) equipped with an evaporator (produced by Kyoto Electronics Manufacturing Co., Ltd., ADP-611), and by setting the temperature of this evaporator to 130° C. If the moisture content in the conductive paste is 1.0 mass % or more, the battery performance will be insufficient; the conductive paste of the present invention is substantially a non-aqueous conductive paste.

Other Additives

The conductive paste for lithium-ion secondary battery positive electrodes may contain components other than the above components (A), (B), and (C) (sometimes referred to as "other additives"). Examples of the other additives include a neutralizing agent, a pigment dispersant, a defoaming agent, an antiseptic agent, an anti-rust agent, a plasticizer, a binding agent (binder), and the like.

Examples of pigment dispersants and/or binding agents include acrylic resins, polyester resins, epoxy resins, polyether resins, alkyd resins, urethane resins, silicone resins, polycarbonate resins, silicate resins, chlorine-based resins, fluorine-based resins, polyvinylpyrrolidone resins, polyvinyl alcohol resins, polyvinyl acetal resins, composite resins thereof, and the like, other than the above resins (A1), (A2), and (A3). These resins may be used alone, or in a combination of two or more. Of these, polyvinylidene fluoride (PVDF) is preferably used.

Further, the conductive paste for lithium-ion battery positive electrodes may optionally contain an acidic compound. The acidic compound is not particularly limited, and any of inorganic acids and organic acids may be used. Examples of inorganic acids include hydrochloric acid, sulfuric acid, nitric acid, phosphoric acid, and the like. Examples of organic acids include carboxylic acid compounds, sulfonic acid compounds, and the like. Examples of carboxylic acid compounds include formic acid, acetic acid, propionic acid, butyric acid, tartaric acid, oxalic acid, malonic acid, succinic acid, glutaric acid, adipic acid, pimelic acid, suberic acid, (meth)acrylic acid, crotonic acid, fumaric acid, maleic acid, itaconic acid, citraconic acid, fluoroacetic acid, and the like.

Examples of sulfonic acid compounds include methanesulfonic acid, para-toluenesulfonic acid, dodecylbenzenesulfonic acid, dinonylnaphthalenesulfonic acid, dinonylnaphthalenedisulfonic acid, and the like. In addition to the above, anhydrides or hydrates of these acidic compounds, or an acidic compound in which a portion is a salt form may also be used. These may be used alone, or in a combination of two or more.

Method for Producing Conductive Paste for Lithium-Ion Battery Positive Electrodes The total solids content of the dispersion resin (A) in the solids content of the conductive paste for lithium-ion battery positive electrodes of the present invention is usually 30 mass % or less, and preferably 20 mass % or less, in view of, for example, the viscosity at the time that the pigment is dispersed, as well as pigment dispersibility, dispersion stability, and production efficiency. Further, in a preferable embodiment of the present invention, from the viewpoint of the conductivity of a coating film, the total solids content of the dispersion resin (A) contained in the solids content of the conductive paste for lithium-ion battery positive electrodes of the present invention is usually 20 mass % or less, preferably 0.1 to 15 mass %, and more preferably 1.0 to 10 mass %.

The solids content of the conductive carbon (B) in the solids content of the conductive paste for lithium-ion battery positive electrodes of the present invention is usually 50 mass % or more and less than 100 mass %, preferably 60 mass % or more and less than 100 mass %, and more preferably 70 mass % or more and less than 100 mass %, in view of the battery performance. Further, the amount of the solvent (C) contained in the conductive paste for lithium-ion battery positive electrodes of the present invention is usually 50 mass % or more and less than 100 mass %, preferably 70 mass % or more and less than 100 mass %, and more preferably 80 mass % or more and less than 100 mass %, in view of the drying efficiency and paste viscosity.

The conductive paste for lithium-ion battery positive electrodes of the present invention may be produced by uniformly mixing and dispersing each component described above by using, for example, a known dispersion device, such as a paint shaker, a sand mill, a ball mill, a pebble mill, an LMZ mill, a DCP pearl mill, a planetary ball mill, a homogenizer, a twin-screw kneader, and a thin-film spin system high-speed mixer.

As described later, the conductive paste for lithium-ion battery positive electrodes of the present invention may be used to produce a mixture paste for lithium-ion battery positive electrodes by being mixed with an electrode active material.

Mixture Paste for Lithium-Ion Battery Positive Electrodes

The present invention further provides a mixture paste for lithium-ion battery positive electrodes comprising the above conductive paste, and further comprising an electrode active material.

Electrode Active Material

Examples of electrode active materials include lithium nickel oxide ($LiNiO_2$), lithium manganese oxide ($LiMn_2O_4$), lithium cobalt oxide ($LiCoO_2$), lithium composite oxides, such as $LiNi_{1/3}CO_{1/3}Mn_{1/3}O_2$, and the like. These electrode active materials may be used alone, or in a combination of two or more. The solids content of the electrode active material in the solids content of the mixture paste for lithium-ion battery positive electrodes of the present invention is usually 70 mass % or more and less than 100 mass %, and preferably 80 mass % or more and less than 100 mass %, in view of, for example, the battery capacity and battery resistance.

Method for Producing Mixture Paste for Lithium-Ion Battery Positive Electrodes

The mixture paste for lithium-ion battery positive electrodes of the present invention may be obtained by first preparing the conductive paste for lithium-ion battery positive electrodes described above, and then mixing an electrode active material with the conductive paste. The mixture paste for lithium-ion battery positive electrodes of the present invention may also be prepared by mixing the above-described component (A), component (B), component (C), and an electrode active material.

The total solids content of the dispersion resin (A) in the solids content of the mixture paste for lithium-ion battery positive electrodes of the present invention is usually 0.001 to 20 mass %, and preferably 0.005 to 10 mass %, in view of, for example, the battery performance and the paste viscosity.

The solids content of the conductive carbon (B) in the solids content of the mixture paste for lithium-ion battery positive electrodes of the present invention is usually 0.01 to 30 mass %, preferably 0.05 to 20 mass %, and more preferably 0.1 to 15 mass %, in view of battery performance. Further, the amount of the solvent (C) contained in the mixture paste for lithium-ion battery positive electrodes of the present invention is usually 0.1 to 60 mass %, preferably 0.5 to 50 mass %, and more preferably 1 to 45 mass %, in view of electrode drying efficiency and paste viscosity.

Method for Producing Electrode for Lithium-Ion Battery Positive Electrodes

As described above, a positive-electrode mixture layer of a lithium-ion secondary battery may be produced by applying a mixture paste for lithium-ion battery positive electrodes to a surface of a positive-electrode core, followed by drying. The conductive paste for lithium-ion secondary battery positive electrodes of the present invention is used to form a mixture layer; in addition, it may also be used to form a primer layer between a positive-electrode core and a mixture layer. The mixture paste for lithium-ion battery positive electrodes may be applied by using a known method that uses a die coater. The amount of the mixture paste for lithium-ion battery positive electrodes to be applied is not particularly limited. For example, the amount may be determined to achieve a thickness of the positive electrode mixture layer after drying of 0.04 to 0.30 mm, and preferably 0.06 to 0.24 mm. The temperature of the drying step may be suitably determined, for example, within a range of 80 to 200° C., and preferably 100 to 180° C. The time for the drying step may be suitably determined, for example, within a range of 5 to 120 seconds, and preferably from 5 to 60 seconds.

The present invention is described in more detail below with reference to Examples. However, the present invention is not limited to these specific embodiments.

EXAMPLES

The present invention is described in more detail below with reference to Production Examples, Examples, and Comparative Examples. However, the present invention is not limited to these Examples. In the following Examples, parts and percentages (%) are by mass.

Production of Resin for Pigment Dispersion
Production of Resin (A1) Containing Polymerizable Unsaturated Group-Containing Monomer (A1-1)

Production Example 1

In a reactor equipped with a thermometer, a reflux condenser tube, a nitrogen gas inlet tube, and a stirrer, a copolymerization reaction was performed at a temperature of about 60° C. using 90 parts by mass of vinyl acetate and 10 parts by mass of 2-propen-1-ol as polymerizable monomers, methanol as a solvent, and azobisisobutyronitrile as a polymerization initiator. Thereafter, unreacted monomers were removed under reduced pressure to obtain a resin solution. Subsequently, a solution of sodium hydroxide in methanol was added thereto, and a saponification reaction was performed. After sufficient washing, the resulting product was dried with a hot air dryer. A polyvinyl alcohol resin No. 1 containing 10 mass % of polymerizable unsaturated group-containing monomer (A1-1) and having a polymerization degree of 300 and a saponification degree of 90 mol % was finally obtained.

Production Example 2

In a reactor equipped with a thermometer, a reflux condenser tube, a nitrogen gas inlet tube, and a stirrer, a copolymerization reaction was performed at a temperature of about 60° C. using 90 parts by mass of vinyl acetate and 10 parts by mass pf 2-butene-1,4-diol as polymerizable monomers, methanol as a solvent, and azobisisobutyronitrile as a polymerization initiator. Thereafter, unreacted monomers were removed under reduced pressure to obtain a resin solution. Subsequently, a solution of sodium hydroxide in methanol was added thereto, and a saponification reaction was performed. After sufficient washing, the resulting product was dried with a hot air dryer. A polyvinyl alcohol resin No. 2 containing 10 mass % of polymerizable unsaturated group-containing monomer (A1-1) and having a polymerization degree of 300 and a saponification degree of 90 mol % was finally obtained.

Production Example 3

In a reactor equipped with a thermometer, a reflux condenser tube, a nitrogen gas inlet tube, and a stirrer, a copolymerization reaction was performed at a temperature of about 60° C. using 90 parts by mass of vinyl acetate and 10 parts by mass of 1-butene-3,4-diol as polymerizable monomers, methanol as a solvent, and azobisisobutyronitrile as a polymerization initiator. Thereafter, unreacted monomers were removed under reduced pressure to obtain a resin solution. Subsequently, a solution of sodium hydroxide in methanol was added thereto, and a saponification reaction was performed. After sufficient washing, the resulting product was dried with a hot air dryer. A polyvinyl alcohol resin No. 3 containing 10 mass % of polymerizable unsaturated group-containing monomer (A1-1) and having a polymerization degree of 300 and a saponification degree of 90 mol % was finally obtained.

Production Example 4

In a reactor equipped with a thermometer, a reflux condenser tube, a nitrogen gas inlet tube, and a stirrer, a copolymerization reaction was performed at a temperature of about 60° C. using 90 parts by mass of vinyl acetate and 10 parts by mass of 1-pentene-4,5-diol as polymerizable monomers, methanol as a solvent, and azobisisobutyronitrile as a polymerization initiator. Thereafter, unreacted monomers were removed under reduced pressure to obtain a resin solution. Subsequently, a solution of sodium hydroxide in methanol was added thereto, and a saponification reaction was performed. After sufficient washing, the resulting product was dried with a hot air dryer. A polyvinyl alcohol resin No. 4 containing 10 mass % of polymerizable unsaturated group-containing monomer (A1-1) and having a polymerization degree of 300 and a saponification degree of 90 mol % was finally obtained.

Production Example 5

In a reactor equipped with a thermometer, a reflux condenser tube, a nitrogen gas inlet tube, and a stirrer, a copolymerization reaction was performed at a temperature of about 60° C. using 90 parts by mass of vinyl acetate and 10 parts by mass of 1-pentene-4,5-diol as polymerizable monomers, methanol as a solvent, and azobisisobutyronitrile as a polymerization initiator. Thereafter, unreacted monomers were removed under reduced pressure to obtain a resin solution. Subsequently, a solution of sodium hydroxide in methanol was added thereto, and a saponification reaction was performed. After sufficient washing, the resulting product was dried with a hot air dryer. A polyvinyl alcohol resin No. 5 containing 10 mass % of polymerizable unsaturated group-containing monomer (A1-1) and having a polymerization degree of 300 and a saponification degree of 80 mol % was finally obtained.

Production Example 6

In a reactor equipped with a thermometer, a reflux condenser tube, a nitrogen gas inlet tube, and a stirrer, a copolymerization reaction was performed at a temperature of about 60° C. using 70 parts by mass of vinyl acetate and 30 parts by mass of 1-pentene-4,5-diol as polymerizable monomers, methanol as a solvent, and azobisisobutyronitrile as a polymerization initiator. Thereafter, unreacted monomers were removed under reduced pressure to obtain a resin solution. Subsequently, a solution of sodium hydroxide in methanol was added thereto, and a saponification reaction was performed. After sufficient washing, the resulting product was dried with a hot air dryer. A polyvinyl alcohol resin No. 6 containing 30 mass % of polymerizable unsaturated group-containing monomer (A1-1) and having a polymerization degree of 300 and a saponification degree of 90 mol % was finally obtained.

Production Example 7

In a reactor equipped with a thermometer, a reflux condenser tube, a nitrogen gas inlet tube, and a stirrer, a copolymerization reaction was performed at a temperature of about 60° C. using 90 parts by mass of vinyl acetate and 10 parts by mass of 2-hydroxyethyl methacrylate as polymerizable monomers, methanol as a solvent, and azobisisobutyronitrile as a polymerization initiator. Thereafter, unreacted monomers were removed under reduced pressure to obtain a resin solution. Subsequently, a solution of sodium hydroxide in methanol was added thereto, and a saponification reaction was performed. After sufficient washing, the resulting product was dried with a hot air dryer. A polyvinyl alcohol resin No. 7 containing 10 mass % of polymerizable unsaturated group-containing monomer (A1-1) and having a polymerization degree of 300 and a saponification degree of 90 mol % was finally obtained.

Production Example 8

In a reactor equipped with a thermometer, a reflux condenser tube, a nitrogen gas inlet tube, and a stirrer, a copolymerization reaction was performed at a temperature of about 100° C. using 10 parts by mass of 2-hydroxyethyl methacrylate, 30 parts by mass of acrylamide, and 60 parts by mass of methyl methacrylate as polymerizable monomers, propylene glycol monomethyl ether as a solvent, and azobisisobutyronitrile as a polymerization initiator to obtain a resin solution, followed by drying with a hot air dryer. An acrylic resin No. 1 containing 10 mass % of polymerizable unsaturated group-containing monomer (A1-1) and having a weight average molecular weight of 10,000 was finally obtained.

Comparison Production Example 1

In a reactor equipped with a thermometer, a reflux condenser tube, a nitrogen gas inlet tube, and a stirrer, a copolymerization reaction was performed at a temperature of about 100° C. using 30 parts by mass of acrylamide and 70 parts by mass of methyl methacrylate as polymerizable monomers, propylene glycol monomethyl ether as a solvent, and azobisisobutyronitrile as a polymerization initiator to obtain a resin solution, followed by drying with a hot air dryer. A polymerizable unsaturated group-containing monomer (A1-1)-free acrylic resin No. 2 having a weight average molecular weight of 10,000 was finally obtained.

Polymerizable Unsaturated Group-Containing Monomer (A1-1)-Free Polyvinyl Alcohol Resin (A2)

Production Example 9

In a reactor equipped with a thermometer, a reflux condenser tube, a nitrogen gas inlet tube, and a stirrer, a copolymerization reaction was performed at a temperature of about 60° C. using vinyl acetate as a polymerizable monomer, methanol as a solvent, and azobisisobutyronitrile as a polymerization initiator. Thereafter, unreacted monomers were removed under reduced pressure to obtain a resin solution. Subsequently, a solution of sodium hydroxide in methanol was added thereto, and a saponification reaction was performed. After sufficient washing, the resulting product was dried with a hot air dryer. A polymerizable unsaturated group-containing monomer (A1-1)-free polyvinyl alcohol resin No. 8 having a polymerization degree of 500 and a saponification degree of 25 mol % was finally obtained.

Production Example 10

In a reactor equipped with a thermometer, a reflux condenser tube, a nitrogen gas inlet tube, and a stirrer, a copolymerization reaction was performed at a temperature of about 60° C. using vinyl acetate as a polymerizable monomer, methanol as a solvent, and azobisisobutyronitrile as a polymerization initiator. Thereafter, unreacted monomers were removed under reduced pressure to obtain a resin solution. Subsequently, a solution of sodium hydroxide in methanol was added thereto, and a saponification reaction was performed. After sufficient washing, the resulting product was dried with a hot air dryer. A polymerizable unsaturated group-containing monomer (A1-1)-free polyvinyl alcohol resin No. 9 having a polymerization degree of 500 and a saponification degree of 50 mol % was finally obtained.

Production Example 11

In a reactor equipped with a thermometer, a reflux condenser tube, a nitrogen gas inlet tube, and a stirrer, a copolymerization reaction was performed at a temperature of about 60° C. using vinyl acetate as a polymerizable monomer, methanol as a solvent, and azobisisobutyronitrile as a polymerization initiator. Thereafter, unreacted monomers were removed under reduced pressure to obtain a resin solution. Subsequently, a solution of sodium hydroxide in methanol was added thereto, and a saponification reaction was performed. After sufficient washing, the resulting product was dried with a hot air dryer. A polymerizable unsaturated group-containing monomer (A1-1)-free polyvinyl alcohol resin No. 10 having a polymerization degree of 500 and a saponification degree of 70 mol % was finally obtained.

Production Example 12

In a reactor equipped with a thermometer, a reflux condenser tube, a nitrogen gas inlet tube, and a stirrer, a copolymerization reaction was performed at a temperature of about 60° C. using vinyl acetate as a polymerizable monomer, methanol as a solvent, and azobisisobutyronitrile as a polymerization initiator. Thereafter, unreacted monomers were removed under reduced pressure to obtain a resin solution. Subsequently, a solution of sodium hydroxide in methanol was added thereto, and a saponification reaction was performed. After sufficient washing, the resulting product was dried with a hot air dryer. A polymerizable unsaturated group-containing monomer (A1-1)-free polyvinyl alcohol resin No. 11 having a polymerization degree of 500 and a saponification degree of 90 mol % was finally obtained.

Production of Polycyclic Aromatic Hydrocarbon Group-Containing Resin (A3)

Production Example 13

Three hundred parts of propylene glycol monomethyl ether was placed in a reactor equipped with a stirrer, a heater and a condenser tube. After replacing the air with nitrogen gas, the reactor was maintained at 110° C. The following Monomer Mixture and 400 parts of MPEG2000 (trade name; produced by Nippon Oil & Fats Co., Ltd.; polyoxyethylene glycol monomethyl ether; number average molecular weight: about 2000; active ingredient: 50%; separately added dropwise since MPEG2000 does not dissolve with other monomers) were added thereto dropwise over a period of 3 hours.

Monomer Mixture

| | |
|---|---|
| 4-hydroxy-1-naphthyl methacrylate | 300 parts |
| Styrene | 200 parts |
| n-Butyl acrylate | 300 parts |
| 2,2'-Azobis(2-methylbutyronitrile) | 40 parts |

One hour after the completion of the dropwise addition, a solution obtained by dissolving 5 parts of 2,2'-azobis(2-methylbutyronitrile) in 100 parts of propylene glycol monomethyl ether was added thereto dropwise over a period of 1 hour. After the completion of the dropwise addition, the resulting product was maintained at 110° C. for another 1 hour, and then removed to be dried with a hot air dryer. A polycyclic aromatic hydrocarbon group-containing resin No. 1 solution having a solids content of 100% was finally obtained. The polycyclic aromatic hydrocarbon group-containing resin No. 1 had a weight average molecular weight of 10,000.

Production Examples 14 to 22

Polycyclic aromatic hydrocarbon group-containing resin No. 2 to 10 solutions were produced by using the same composition and the same production method as Production Example 13, except that the types and amounts of the monomer composition of Production Example 13 were changed as shown in the following Table 1.

TABLE 1

| Production Example | 13 | 14 | 15 | 16 | 17 | 18 | 19 | 20 | 21 | 22 |
|---|---|---|---|---|---|---|---|---|---|---|
| Resin name | No. 1 | No. 2 | No. 3 | No. 4 | No. 5 | No. 6 | No. 7 | No. 8 | No. 9 | No. 10 |
| 4-Hydroxy-1-naphthyl methacrylate | 300 | | | 300 | | | 300 | 600 | | |
| 4-Ethoxy-1-naphthyl acrylate | | 300 | | | 300 | | | | | |
| 2-Methoxy-4-phenoxy Carbonyloxy-1-naphthyl acrylate | | | 300 | | | 300 | | | 300 | 300 |
| Styrene | 200 | 200 | 200 | 200 | 200 | 200 | 200 | 50 | 200 | 200 |
| n-Butyl acrylate | 300 | 300 | 300 | 100 | 100 | 100 | 100 | 50 | 100 | 100 |
| MPEG2000 | 200 | 200 | 200 | 200 | 200 | 200 | 200 | 100 | 200 | 200 |
| N,N-Dimethyl acrylamide | | | | 200 | | | | | | |
| N-Hydroxyethyl acrylamide | | | | | | 200 | | 200 | 200 | 200 |
| N-Ethyl-N-hydroxyethyl acrylamide | | | | | | | 200 | | | |
| Molecular weight (Mw) | 10000 | 10000 | 10000 | 10000 | 10000 | 10000 | 10000 | 10000 | 10000 | 10000 |

The monomer amounts shown in the table are active ingredient values.

Production of Conductive Paste

Example 1

Thirty parts (solids content: 30 parts) of polyvinyl alcohol resin No. 1 containing 10 mass % of polymerizable unsaturated group-containing monomer (A1-1) obtained in Production Example 1, 1200 parts of acetylene black, 220 parts of KF polymer W#7300 (trade name, polyvinylidene fluoride, produced by Kureha Corporation), and 8500 parts of N-methyl-2-pyrrolidone were mixed and dispersed using a ball mill for 5 hours to obtain Conductive paste X-1.

Examples 2 to 31 and Comparative Examples 1 to 3

Conductive pastes X-2 to X-34 were produced as in Example 1, except that the composition of the conductive paste was changed as shown in the following Table 2. The amounts shown in the table are based on solids content. Additionally, the moisture content (mass %) in the conductive pastes was adjusted as shown in the following Table 2. The moisture content shown in the table was measured by a Karl-Fischer moisture meter (produced by Kyoto Electronics Manufacturing Co., Ltd., product name: MKC-610).

TABLE 2

|  |  | \multicolumn{12}{c}{Examples and Comparative Examples Examples} |
|---|---|---|---|---|---|---|---|---|---|---|---|---|---|
|  |  | 1 | 2 | 3 | 4 | 5 | 6 | 7 | 8 | 9 | 10 | 11 | 12 |
| Name of conductive paste |  | X-1 | X-2 | X-3 | X4 | X-5 | X-6 | X-7 | X-8 | X-9 | X-10 | X-11 | X-12 |
| Monomer (A1-1)-containing resin (A1) | Polyvinyl alcohol resin No. 1 | 30 |  |  |  |  |  |  |  |  |  |  |  |
|  | Polyvinyl alcohol resin No. 2 |  | 30 |  |  |  |  |  |  |  |  |  |  |
|  | Polyvinyl alcohol resin No. 3 |  |  | 30 |  |  |  |  |  |  |  |  |  |
|  | Polyvinyl alcohol resin No. 4 |  |  |  | 30 |  |  |  |  | 24 | 24 | 24 | 24 |
|  | Polyvinyl alcohol resin No. 5 |  |  |  |  | 30 |  |  |  |  |  |  |  |
|  | Polyvinyl alcohol resin No. 6 |  |  |  |  |  | 30 |  |  |  |  |  |  |
|  | Polyvinyl alcohol resin No. 7 |  |  |  |  |  |  | 30 |  |  |  |  |  |
|  | Acrylic resin No. 1 |  |  |  |  |  |  |  | 30 |  |  |  |  |
|  | Acrylic resin No. 2 (free from monomer (A1-1)) |  |  |  |  |  |  |  |  |  |  |  |  |
| PVA resin (A2) | Polyvinyl alcohol resin No. 8 |  |  |  |  |  |  |  |  | 6 |  |  |  |
|  | Polyvinyl alcohol resin No. 9 |  |  |  |  |  |  |  |  |  | 6 |  |  |
|  | Polyvinyl alcohol resin No. 10 |  |  |  |  |  |  |  |  |  |  | 6 |  |
|  | Polyvinyl alcohol resin No. 11 |  |  |  |  |  |  |  |  |  |  |  | 6 |
| Polycyclic aromatic hydrocarbon group-containing resin (A3) | Polycyclic aromatic hydrocarbon group-containing resin No. 1 |  |  |  |  |  |  |  |  |  |  |  |  |
|  | Polycyclic aromatic hydrocarbon group-containing resin No. 2 |  |  |  |  |  |  |  |  |  |  |  |  |
|  | Polycyclic aromatic hydrocarbon group-containing resin No. 3 |  |  |  |  |  |  |  |  |  |  |  |  |
|  | Polycyclic aromatic hydrocarbon group-containing resin No. 4 |  |  |  |  |  |  |  |  |  |  |  |  |
|  | Polycyclic aromatic hydrocarbon group-containing resin No. 5 |  |  |  |  |  |  |  |  |  |  |  |  |
|  | Polycyclic aromatic hydrocarbon group-containing resin No. 6 |  |  |  |  |  |  |  |  |  |  |  |  |
|  | Polycyclic aromatic hydrocarbon group-containing resin No. 7 |  |  |  |  |  |  |  |  |  |  |  |  |
|  | Polycyclic aromatic hydrocarbon group-containing resin No. 8 |  |  |  |  |  |  |  |  |  |  |  |  |
|  | Polycyclic aromatic hydrocarbon group-containing resin No. 9 |  |  |  |  |  |  |  |  |  |  |  |  |
|  | Polycyclic aromatic hydrocarbon group-containing resin No. 10 |  |  |  |  |  |  |  |  |  |  |  |  |

TABLE 2-continued

| | | | | | | | | | | | | | |
|---|---|---|---|---|---|---|---|---|---|---|---|---|---|
| Other resin | KF polymer W#7300 | 220 | 220 | 220 | 220 | 220 | 220 | 220 | 220 | 220 | 220 | 220 | 220 |
| Acidic compound | Diphosphorus pentaoxide | | | | | | | | | | | | |
| | Acetic anhydride | | | | | | | | | | | | |
| | Methanesulfonic anhydride | | | | | | | | | | | | |
| Pigment (B) | Acetylene black | 1200 | 1200 | 1200 | 1200 | 1200 | 1200 | 1200 | 1200 | 1200 | 1200 | 1200 | 1200 |
| | Graphite | | | | | | | | | | | | |
| Solvent | N-methyl-2-pyrrolidone | 8500 | 8500 | 8500 | 8500 | 8500 | 8500 | 8500 | 8500 | 8500 | 8500 | 8500 | 8500 |
| Moisture content (%) | | 0.6 | 0.6 | 0.6 | 0.6 | 0.6 | 0.6 | 0.6 | 0.6 | 0.6 | 0.6 | 0.6 | 0.6 |

| | | Examples and Comparative Examples — Examples | | | | | | | | | | | |
|---|---|---|---|---|---|---|---|---|---|---|---|---|---|
| | | 13 | 14 | 15 | 16 | 17 | 18 | 19 | 20 | 21 | 22 | 23 | 24 |
| Name of conductive paste | | X-13 | X-14 | X-15 | X-16 | X-17 | X-18 | X-19 | X-20 | X-21 | X-22 | X-23 | X-24 |
| Monomer (A1-1)-containing resin (A1) | Polyvinyl alcohol resin No. 1 | | | | | | | | | | | | |
| | Polyvinyl alcohol resin No. 2 | | | | | | | | | | | | |
| | Polyvinyl alcohol resin No. 3 | | | | | | | | | | | | |
| | Polyvinyl alcohol resin No. 4 | 24 | 18 | 18 | 18 | 18 | 18 | 18 | 18 | 18 | 18 | 18 | 18 |
| | Polyvinyl alcohol resin No. 5 | | | | | | | | | | | | |
| | Polyvinyl alcohol resin No. 6 | | | | | | | | | | | | |
| | Polyvinyl alcohol resin No. 7 | | | | | | | | | | | | |
| | Acrylic resin No. 1 | | | | | | | | | | | | |
| | Acrylic resin No. 2 (free from monomer (A1-1)) | | | | | | | | | | | | |
| PVA resin (A2) | Polyvinyl alcohol resin No. 8 | | | | | | | | | | | | |
| | Polyvinyl alcohol resin No. 9 | | 6 | 6 | 6 | 6 | 6 | 6 | 6 | 6 | 6 | 6 | 6 |
| | Polyvinyl alcohol resin No. 10 | | | | | | | | | | | | |
| | Polyvinyl alcohol resin No. 11 | | | | | | | | | | | | |
| Polycyclic aromatic hydrocarbon group-containing resin (A3) | Polycyclic aromatic hydrocarbon group-containing resin No. 1 | 6 | 6 | | | | | | | | | | |
| | Polycyclic aromatic hydrocarbon group-containing resin No. 2 | | | 6 | | | | | | | | | |
| | Polycyclic aromatic hydrocarbon group-containing resin No. 3 | | | | 6 | | | | | | | | |
| | Polycyclic aromatic hydrocarbon group-containing resin No. 4 | | | | | 6 | | | | | | | |
| | Polycyclic aromatic hydrocarbon group-containing resin No. 5 | | | | | | 6 | | | | | | |
| | Polycyclic aromatic hydrocarbon group-containing resin No. 6 | | | | | | | 6 | | | | | |
| | Polycyclic aromatic hydrocarbon group-containing resin No. 7 | | | | | | | | 6 | 6 | | | |
| | Polycyclic aromatic hydrocarbon group-containing resin No. 8 | | | | | | | | | | | | 6 |
| | Polycyclic aromatic | | | | | | | | | | 6 | 6 | |

TABLE 2-continued

| | | | | | | | | | | | | |
|---|---|---|---|---|---|---|---|---|---|---|---|---|
| | hydrocarbon group-containing resin No. 9 | | | | | | | | | | | |
| | Polycyclic aromatic hydrocarbon group-containing resin No. 10 | | | | | | | | | | | |
| Other resin | KF polymer W#7300 | 220 | 220 | 220 | 220 | 220 | 220 | 220 | 220 | 220 | 220 | 220 | 220 |
| Acidic compound | Diphosphorus pentaoxide | | | | | | | | | | | | |
| | Acetic anhydride | | | | | | | | | | | | |
| | Methanesulfonic anhydride | | | | | | | | | | | | |
| Pigment (B) | Acetylene black | 1200 | 1200 | 1200 | 1200 | 1200 | 1200 | 1200 | 600 | | 1200 | 1200 | 1200 |
| | Graphite | | | | | | | | 600 | 1200 | | | |
| Solvent | N-methyl-2-pyrrolidone | 8500 | 8500 | 8500 | 8500 | 8500 | 8500 | 8500 | 8500 | 8500 | 8500 | 8500 | 8500 |
| Moisture content (%) | | 0.6 | 0.6 | 0.6 | 0.6 | 0.6 | 0.6 | 0.6 | 0.6 | 0.6 | 0.8 | 1.0 | 0.6 |

| | | | Examples and Comparative Examples ||||||||||
|---|---|---|---|---|---|---|---|---|---|---|---|
| | | | Examples ||||||| Comp. Ex |||
| | | | 25 | 26 | 27 | 28 | 29 | 30 | 31 | 1 | 2 | 3 |
| | Name of conductive paste | | X-25 | X-26 | X-27 | X-28 | X-29 | X-30 | X-31 | X-32 | X-33 | X-34 |
| Monomer (A1-1)-containing resin (A1) | Polyvinyl alcohol resin No. 1 | | | | | | | | | | | |
| | Polyvinyl alcohol resin No. 2 | | | | | | | | | | | |
| | Polyvinyl alcohol resin No. 3 | | | | | | | | | | | | |
| | Polyvinyl alcohol resin No. 4 | | 18 | 18 | 18 | 18 | 24 | 24 | 24 | | | |
| | Polyvinyl alcohol resin No. 5 | | | | | | | | | | | |
| | Polyvinyl alcohol resin No. 6 | | | | | | | | | | | |
| | Polyvinyl alcohol resin No. 7 | | | | | | | | | | | |
| | Acrylic resin No. 1 | | | | | | | | | | | |
| | Acrylic resin No. 2 (free from monomer (A1-1)) | | | | | | | | | 30 | | |
| PVA resin (A2) | Polyvinyl alcohol resin No. 8 | | | | | | | | | | | |
| | Polyvinyl alcohol resin No. 9 | | | | | | | | | | 30 | |
| | Polyvinyl alcohol resin No. 10 | | 6 | 6 | 6 | 6 | | | | | | |
| | Polyvinyl alcohol resin No. 11 | | | | | | | | | | | 30 |
| Polycyclic aromatic hydrocarbon group-containing resin (A3) | Polycyclic aromatic hydrocarbon group-containing resin No. 1 | | | | | | | | | | | |
| | Polycyclic aromatic hydrocarbon group-containing resin No. 2 | | | | | | | | | | | |
| | Polycyclic aromatic hydrocarbon group-containing resin No. 3 | | | | 6 | | | 6 | | | | |
| | Polycyclic aromatic hydrocarbon group-containing resin No. 4 | | | | | | | | | | | |
| | Polycyclic aromatic hydrocarbon group-containing resin No. 5 | | | | | | | | | | | |
| | Polycyclic aromatic hydrocarbon group-containing resin No. 6 | | | | | | | | | | | |
| | Polycyclic aromatic | | 6 | | | 6 | | | 6 | | | |

TABLE 2-continued

|  |  |  |  |  |  |  |  |  |  |  |
|---|---|---|---|---|---|---|---|---|---|---|
|  | hydrocarbon group-containing resin No. 7 |  |  |  |  |  |  |  |  |  |
|  | Polycyclic aromatic hydrocarbon group-containing resin No. 8 |  |  |  |  |  |  |  |  |  |
|  | Polycyclic aromatic hydrocarbon group-containing resin No. 9 |  |  |  |  | 6 |  |  | 6 |  |
|  | Polycyclic aromatic hydrocarbon group-containing resin No. 10 |  |  |  |  |  |  |  |  |  |
| Other resin | KF polymer W#7300 | 220 | 220 | 220 | 220 | 220 | 220 | 220 | 220 | 220 |
| Acidic compound | Diphosphorus pentaoxide |  | 3 |  |  | 3 |  |  |  |  |
|  | Acetic anhydride |  |  | 3 |  |  | 3 |  |  |  |
|  | Methanesulfonic anhydride |  |  |  | 3 |  |  | 3 |  |  |
| Pigment (B) | Acetylene black Graphite | 1200 | 1200 | 1200 | 1200 | 1200 | 1200 | 1200 | 1200 | 1200 |
| Solvent | N-methyl-2-pyrrolidone | 8500 | 8500 | 8500 | 8500 | 8500 | 8500 | 8500 | 8500 | 8500 |
| Moisture content (%) |  | 0.6 | 0.6 | 0.6 | 0.6 | 0.6 | 0.6 | 0.6 | 0.6 | 0.6 |

Mixture Paste Production

Example 32

Eight parts of Conductive paste X-1 obtained in Example 1, 90 parts of active material particles (lithium-nickel manganese oxide particles with spinel structure represented by the compositional formula: $LiNi_{0.5}Mn_{1.5}O_4$; average particle diameter: 6 μm; BET specific surface area: 0.7 m$^2$/g), and 57 parts of N-methyl-2-pyrrolidone were mixed to produce Mixture paste Y-1.

Examples 33 to 62 and Comparative Examples 4 to 6

Mixture pastes Y-2 to Y-34 were produced as in Example 32, except that the type of conductive paste was changed as shown in the following Table 3.

Table 3 below shows the results of evaluation tests mentioned later (viscosity of conductive paste and battery performance). If the results of at least one of the two evaluation tests were "fail," then the conductive paste and mixture paste were considered as "fail."

TABLE 3

| Examples and Comparative Examples | | | | | | | | | | | | |
|---|---|---|---|---|---|---|---|---|---|---|---|---|
| | Examples | | | | | | | | | | | |
| | 32 | 33 | 34 | 35 | 36 | 37 | 38 | 39 | 40 | 41 | 42 | 43 |
| Name of mixture paste | Y-1 | Y-2 | Y-3 | Y-4 | Y-5 | Y-6 | Y-7 | Y-8 | Y-9 | Y-10 | Y-11 | Y-12 |
| Name of conductive paste | X-1 | X-2 | X-3 | X-4 | X-5 | X-6 | X-7 | X-8 | X-9 | X-10 | X-11 | X-12 |
| Evaluation Viscosity | C | B | B | B | B | B | B | C | A | A | A | A |
| Battery performance | C | C | B | B | C | C | C | C | B | A | B | B |

| Examples and Comparative Examples | | | | | | | | | | | |
|---|---|---|---|---|---|---|---|---|---|---|---|
| | Examples | | | | | | | | | | |
| | 44 | 45 | 46 | 47 | 48 | 49 | 50 | 51 | 52 | 53 | 54 |
| Name of mixture paste | Y-13 | Y-14 | Y-15 | Y-16 | Y-17 | Y-18 | Y-19 | Y-20 | Y-21 | Y-22 | Y-23 |
| Name of conductive paste | X-13 | X-14 | X-15 | X-16 | X-17 | X-18 | X-19 | X-20 | X-21 | X-22 | X-23 |
| Evaluation Viscosity | A | A | A | A | S | S | S | A | A | S | S |
| Battery performance | A | S | S | S | S | S | S | S | A | A | B |

| Examples and Comparative Examples | | | | | | | | | | | |
|---|---|---|---|---|---|---|---|---|---|---|---|
| | Examples | | | | | | | | Comp. Ex | | |
| | 55 | 56 | 57 | 58 | 59 | 60 | 61 | 62 | 4 | 5 | 6 |
| Name of mixture paste | Y-24 | Y-25 | Y-26 | Y-27 | Y-28 | Y-29 | Y-30 | Y-31 | Y-32 | Y-33 | Y-34 |
| Name of conductive paste | X-24 | X-25 | X-26 | X-27 | X-28 | X-29 | X-30 | X-31 | X-32 | X-33 | X-34 |
| Evaluation Viscosity | A | S | S | S | S | A | A | A | D | D | D |
| Battery performance | S | S | S | S | S | A | A | A | D | C | D |

Evaluation Test
Viscosity

The viscosity of the conductive pastes obtained in the Examples was measured using a cone and plate viscometer Mars2 (trade name, produced by Haake) at a shear rate of 1.0 sec$^{-1}$, and evaluated according to the following criteria. As the evaluation, S, A, B, and C were pass, and D was fail.
S: the viscosity was less than 1 Pa·s
A: the viscosity was 1 Pa·s or more and less than 5 Pa·s
B: the viscosity was 5 Pa·s or more and less than 30 Pa·s
C: the viscosity was 30 Pa·s or more and less than 100 Pa·s
D: the viscosity was 100 Pa·s or more
Battery Performance (IV Resistance Increase Rate)

The battery performance (IV resistance increase rate) was evaluated using Mixture pastes Y-1 to Y-34 obtained in Examples 32 to 62 and Comparative Examples 4 to 6. The evaluation method was performed in accordance with the following procedure.

(1) Conductive pastes and mixture pastes were produced in accordance with the method described in the "Production of Conductive Pastes and Mixture Pastes Used as Blank Samples" section below. Then, lithium-ion secondary batteries each comprising a positive electrode and a negative electrode were constructed in accordance with the methods described in the "Production of Positive Electrode," "Production of Negative Electrode," and "Construction of Lithium-Ion Secondary Battery" sections below. Subsequently, the IV resistance was measured using the obtained lithium-ion secondary batteries in accordance with the "IV Resistance Measurement Method" below.

(2) Lithium-ion secondary batteries each comprising a positive electrode and a negative electrode were constructed as in (1) above, except that Mixture pastes Y-1 to Y-34 obtained in the Examples and Comparative Examples were used in place of the mixture pastes prepared as blank samples. Then, the IV resistance was measured. Subsequently, the IV resistance increase rates (%) were calculated with respect to the blank samples, and evaluated. Since three different types of conductive carbon (acetylene black alone, a combination of acetylene black and graphite, and graphite alone) were used, a comparison was made with respect to blank samples of the same type of pigment (mixture paste Y-20 was evaluated in comparison with a blank sample of 600 parts of acetylene black and 600 parts of graphite, mixture paste Y-21 was evaluated in comparison with a blank sample of 1200 parts of graphite, and other mixture pastes were evaluated in comparison with a blank sample of 1200 parts of acetylene black).

The battery performance (IV resistance increase rate) was evaluated in accordance with the following criteria. S, A, B, and C were evaluated as "pass," and D was evaluated as "fail."
S: the IV resistance increase rate was less than +3%, compared with the blank sample
A: the IV resistance increase rate was +3% or more and less than +4.5%, compared with the blank sample
B: the IV resistance increase rate was +4.5% or more and less than +6%, compared with the blank sample
C: the IV resistance increase rate was +6% or more and less than +8%, compared with the blank sample
D: the IV resistance increase rate was +8% or more, compared with the blank sample
Production of Conductive Pastes and Mixture Pastes Used as Blank Samples One thousand and two hundred parts of acetylene black, 220 parts of KF polymer W#7300 (trade name, polyvinylidene fluoride, produced by Kureha Corporation), and 8500 parts of N-methyl-2-pyrrolidone were mixed and dispersed using a ball mill for 5 hours to obtain a dispersant-free conductive paste.

Eight parts of the conductive paste obtained above, 90 parts of active material particles (lithium-nickel manganese oxide particles with spinel structure represented by the compositional formula: LiNi$_{0.5}$Mn$_{1.5}$O$_4$; average particle diameter: 6 μm; BET specific surface area: 0.7 m$^2$/g), and 57 parts of N-methyl-2-pyrrolidone were mixed to obtain a dispersant-free mixture paste to be used as a blank sample. Additionally, blank samples were produced using 600 parts of acetylene black and 600 parts of graphite, or 1200 parts of graphite, in place of 1200 parts of acetylene black (three types of blank samples were produced: acetylene black alone, a combination of acetylene black and graphite, and graphite alone).
Production of Positive Electrode The mixture paste was applied to both surfaces of an elongated aluminum foil having an average thickness of about 15 lam (positive electrode collector) in an amount of 10 mg/cm$^2$ (based on solids content) per surface by a roller coating method to form a strip, and dried (at a drying temperature of 80° C. for 1 minute) to form a positive-electrode-active-material layer. The positive-electrode-active-material layer supported on the positive electrode collector was pressed using a roll press, thereby adjusting the properties.
Production of Negative Electrode A natural graphite powder (C, average particle diameter: 5 μm; specific surface area: 3 m$^2$/g) as a negative electrode active material, a styrene-butadiene rubber (SBR) as a binder, and carboxymethyl cellulose (CMC) as a thickener were mixed with ion exchanged water, so that the mass ratio of these materials was C:SBR:CMC=98:1:1, and the solids concentration was about 45 mass %, thereby preparing a slurry for forming a negative-electrode-active-material layer. This slurry was applied to both surfaces of an elongated copper foil having an average thickness of about 10 μm (negative electrode collector) in an amount of 7 mg/cm$^2$ (based on solids content) per surface by a roller coating method to form a strip, and dried (at a drying temperature of 120° C. for 1 minute) to form a negative-electrode-active-material layer. The resulting product was pressed using a roll press, thereby adjusting the properties.
Construction of Lithium-Ion Secondary Battery The positive electrode sheet and the negative electrode sheet produced above were disposed facing each other via a separator sheet (a three-layered structure with a thickness of 20 μm in which polypropylene (PP) was laminated on both surfaces of polyethylene (PE)), and elliptically wound to prepare a wound electrode body. The produced electrode body was disposed in a cylindrical battery case, to which a non-aqueous electrolyte solution (obtained by dissolving LiPF$_6$ as a supporting salt at a concentration of 1.0 mol/L in a mixed solvent containing ethylene carbonate (EC), dimethyl carbonate (DMC), and ethylmethyl carbonate (EMC) at a volume ratio of EC:DMC:EMC=3:4:3) was introduced. Then, a positive-electrode terminal and a negative-electrode terminal were welded to the positive electrode collector and negative electrode collector exposed at the end of the electrode body, and the battery case was sealed to construct a 18650-type lithium-ion secondary battery.
IV Resistance Measurement Method The IV resistance of a cell for evaluation with a state-of-charge (SOC) of 60% was measured in an environment at −30° C. The IV resistance here was measured as follows: a constant current discharge at a previously determined electric current value (I) was performed for 10 seconds, and a voltage (V) after the current discharge was measured. The previously determined electric current values (I) were plotted on the X-axis while the voltage (V) after each current discharge was plotted on the Y-axis. Then, an approximate straight line was drawn based on the plot obtained by each current discharge, and its slope was considered to be the IV resistance. The IV resistance (mΩ) here was calculated based on the voltages (V) obtained after discharges at constant current values of 0.3 C, 1 C, and 3 C.

The invention claimed is:

1. A conductive paste for lithium-ion battery positive electrodes, the conductive paste comprising a dispersion resin (A), conductive carbon (B), and a solvent (C), the dispersion resin (A) containing a resin (A1), the resin (A1) containing, as one constituent component, a polymerizable unsaturated group-containing monomer (A1-1) represented by the following formula (1):

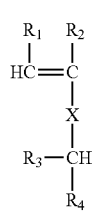

wherein $R_1$, $R_2$, $R_3$, and $R_4$ are identical or different, and each represents at least one member selected from the group consisting of hydrogen, hydrocarbon, hydroxyl, and methylol, at least one of $R_1$, $R_2$, $R_3$, and $R_4$ is hydroxyl, X may or may not be present; when X is present, X is one or more atoms forming a linking chain, the solvent (C) containing N-methyl-2-pyrrolidone, and the resin (A1) containing, as constituent components, the polymerizable unsaturated group-containing monomer (A1-1), a fatty acid vinyl ester (A1-2), and vinyl alcohol (A1-3), the polymerizable unsaturated group-containing monomer (A1-1) being contained in an amount of 0.1 to 20 mass %.

2. The conductive paste for lithium-ion battery positive electrodes according to claim 1, wherein the dispersion resin (A) further contains a polymerizable unsaturated group-containing monomer (A1-1)-free polyvinyl alcohol resin (A2) having a saponification degree of 30 to 100 mol %, and wherein the resin (A1) and the resin (A2) are contained at a ratio of 40/60 to 90/10, based on the resin solids mass.

3. The conductive paste for lithium-ion battery positive electrodes according to claim 1, wherein the dispersion resin (A) further contains a polycyclic aromatic hydrocarbon group-containing resin (A3).

4. The conductive paste for lithium-ion battery positive electrodes according to claim 1, wherein the conductive carbon (B) comprises acetylene black.

5. The conductive paste for lithium-ion battery positive electrodes according to claim 1, wherein the conductive carbon (B) comprises graphite.

6. The conductive paste for lithium-ion battery positive electrodes according to claim 1, wherein the conductive paste contains moisture in an amount of less than 1.0 mass %.

7. A mixture paste for lithium-ion battery positive electrodes comprising the conductive paste of claim 1, and further comprising an electrode active material.

8. An electrode for lithium-ion battery positive electrodes, the electrode being obtained by using the mixture paste for lithium-ion battery positive electrodes of claim 7.

9. A lithium-ion battery having the electrode for lithium-ion battery positive electrodes of claim 8.

* * * * *